(12) United States Patent
Hones, Jr. et al.

(10) Patent No.: US 12,416,818 B2
(45) Date of Patent: Sep. 16, 2025

(54) OPHTHALMIC LENSES FOR REDUCING MYOPIC PROGRESSION AND METHODS OF MAKING THE SAME

(71) Applicant: SIGHTGLASS VISION, INC., Palo Alto, CA (US)

(72) Inventors: Peter Hones, Jr., Menlo Park, CA (US); Thomas W. Chalberg, Jr., Menlo Park, CA (US)

(73) Assignee: SightGlass Vision, Inc., Dallas, TX (US)

( * ) Notice: Subject to any disclaimer, the term of this patent is extended or adjusted under 35 U.S.C. 154(b) by 774 days.

(21) Appl. No.: 17/435,636

(22) PCT Filed: Mar. 2, 2020

(86) PCT No.: PCT/US2020/020702
§ 371 (c)(1),
(2) Date: Sep. 1, 2021

(87) PCT Pub. No.: WO2020/180817
PCT Pub. Date: Sep. 10, 2020

(65) Prior Publication Data
US 2022/0146857 A1    May 12, 2022

Related U.S. Application Data

(60) Provisional application No. 62/812,639, filed on Mar. 1, 2019.

(51) Int. Cl.
*G02C 7/00* (2006.01)
*B29D 11/00* (2006.01)
(Continued)

(52) U.S. Cl.
CPC ........ *G02C 7/022* (2013.01); *B29D 11/00009* (2013.01); *B29D 11/00326* (2013.01);
(Continued)

(58) Field of Classification Search
CPC ........ B29D 11/00009; B29D 11/00326; B29D 11/00451; B29D 11/00865; G02C 7/022; G02C 2202/24
(Continued)

(56) References Cited

U.S. PATENT DOCUMENTS

| | | |
|---|---|---|
| 149,270 A | 3/1874 | Watson |
| 338,003 A | 3/1886 | Ward |

(Continued)

FOREIGN PATENT DOCUMENTS

| | | |
|---|---|---|
| AU | 2005289302 | 4/2006 |
| CA | 3058461 A1 | 10/2018 |

(Continued)

OTHER PUBLICATIONS

Ahern "Biochemical, reagents kits offer scientists good return on investment," The Scientist, Jul. 1995, 9(15):20.
(Continued)

*Primary Examiner* — Mahidere S Sahle
(74) *Attorney, Agent, or Firm* — Fish & Richardson P.C.

(57) ABSTRACT

A method includes providing an ophthalmic lens having a prescribed optical power, the ophthalmic lens having a surface having a base curvature corresponding to the prescribed optical power, and exposing a material at the surface to laser radiation sufficient to locally reshape the material to form a plurality of lenslets on the surface. The lenslets each have a corresponding optical power that differs from the prescribed optical power of the ophthalmic lens.

10 Claims, 19 Drawing Sheets

(51) Int. Cl.
*G02C 7/02* (2006.01)
*G02C 7/06* (2006.01)

(52) U.S. Cl.
CPC .. *B29D 11/00451* (2013.01); *B29D 11/00865* (2013.01); *G02C 2202/24* (2013.01)

(58) Field of Classification Search
USPC .............. 351/159.41–159.49, 159.74–159.79
See application file for complete search history.

(56) References Cited

U.S. PATENT DOCUMENTS

| | | | |
|---|---|---|---|
| 506,983 A | 10/1893 | Diemmer et al. | |
| 712,466 A | 10/1902 | Taylor | |
| 3,034,166 A | 5/1962 | Rawlings et al. | |
| 3,507,566 A | 4/1970 | Knapp | |
| 4,194,814 A | 3/1980 | Fischer et al. | |
| 4,338,003 A | 7/1982 | Adrian | |
| 4,460,523 A | 7/1984 | Neefe | |
| 4,558,931 A | 12/1985 | Fuhrman | |
| 4,704,016 A | 11/1987 | de Carle | |
| 4,710,327 A | 12/1987 | Neefe | |
| 4,909,818 A | 3/1990 | Jones | |
| 5,034,100 A | 7/1991 | Sides | |
| 5,034,166 A | 7/1991 | Rawlings et al. | |
| 5,034,188 A | 7/1991 | Rawlings et al. | |
| 5,260,727 A | 11/1993 | Oksman et al. | |
| 5,585,968 A | 12/1996 | Guhman et al. | |
| 5,800,992 A | 9/1998 | Fodor et al. | |
| 5,815,238 A | 9/1998 | Beaton et al. | |
| 5,837,461 A | 11/1998 | Neitz | |
| 5,867,247 A | 2/1999 | Martin et al. | |
| 5,905,561 A | 5/1999 | Lee et al. | |
| 5,926,250 A | 7/1999 | Mukaiyama et al. | |
| 6,149,270 A | 11/2000 | Hayashi | |
| 6,203,156 B1 | 3/2001 | Wu et al. | |
| 6,343,861 B1 | 2/2002 | Kris et al. | |
| 6,582,908 B2 | 6/2003 | Fodor et al. | |
| 6,706,867 B1 | 3/2004 | Lorenz | |
| 6,712,466 B2 | 3/2004 | Dreher | |
| 6,712,467 B1 | 3/2004 | Kitani | |
| 6,754,299 B2 | 6/2004 | Patch | |
| 6,997,554 B2 | 2/2006 | Nakada et al. | |
| 7,025,460 B2 | 4/2006 | Smitth et al. | |
| 7,506,983 B2 | 3/2009 | To et al. | |
| 7,604,351 B2 | 10/2009 | Fukuma et al. | |
| 7,665,842 B2 | 2/2010 | Ho et al. | |
| 7,766,482 B2 | 8/2010 | Smith et al. | |
| 7,862,171 B2 | 1/2011 | Varnas et al. | |
| 7,901,075 B2 | 3/2011 | Rooney et al. | |
| 7,992,997 B2 | 8/2011 | Varnas | |
| 7,997,727 B2 | 8/2011 | Ho et al. | |
| 8,052,278 B2 | 11/2011 | Bovet et al. | |
| 8,057,034 B2 | 11/2011 | Ho et al. | |
| 8,079,702 B2 | 12/2011 | Ballet et al. | |
| 8,115,792 B2 | 2/2012 | Petsch et al. | |
| 8,162,477 B2 | 4/2012 | Carimalo et al. | |
| 8,240,847 B2 | 8/2012 | Holden et al. | |
| RE43,851 E | 12/2012 | To et al. | |
| 8,342,684 B2 | 1/2013 | Ho et al. | |
| 8,500,278 B2 | 8/2013 | Lo et al. | |
| 8,540,365 B2 | 9/2013 | Varnas | |
| 8,684,520 B2 | 4/2014 | Lindacher et al. | |
| 8,690,319 B2 | 4/2014 | Menezes | |
| 8,807,747 B2 | 8/2014 | Guilloux et al. | |
| RE45,147 E | 9/2014 | To et al. | |
| 8,833,936 B2 | 9/2014 | Varnas | |
| 8,926,092 B2 | 1/2015 | Weeber | |
| 8,931,897 B2 | 1/2015 | Holden et al. | |
| 8,950,860 B2 | 2/2015 | Tse et al. | |
| 8,951,729 B2 | 2/2015 | Neitz et al. | |
| 8,992,010 B2 | 3/2015 | Ho et al. | |
| 8,998,408 B2 | 4/2015 | Wei et al. | |
| 9,360,683 B2 | 6/2016 | Buehren | |
| 9,417,463 B2 | 8/2016 | Brennan et al. | |
| 9,423,633 B2 | 8/2016 | Ho et al. | |
| 9,547,182 B2 | 1/2017 | Collins et al. | |
| 9,594,259 B2 | 3/2017 | Brennan et al. | |
| 9,625,739 B2 | 4/2017 | Brennan et al. | |
| 9,709,819 B2 | 7/2017 | Lippens et al. | |
| 9,720,253 B2 | 8/2017 | Neitz et al. | |
| 9,733,494 B2 | 8/2017 | Brennan et al. | |
| 9,746,693 B2 | 8/2017 | Peloux et al. | |
| 9,829,722 B2 | 11/2017 | Tse et al. | |
| 10,012,849 B2 | 7/2018 | Collins et al. | |
| RE47,006 E | 8/2018 | To et al. | |
| 10,042,091 B2 | 8/2018 | Kildishev et al. | |
| 10,061,143 B2 | 8/2018 | Brennan et al. | |
| 10,156,737 B2 | 12/2018 | Martinez et al. | |
| 10,203,522 B2 | 2/2019 | Bakaraju et al. | |
| 10,231,897 B2 | 3/2019 | Tse et al. | |
| 10,247,964 B2 | 4/2019 | Sankaridurg et al. | |
| 10,268,050 B2 | 4/2019 | To et al. | |
| 10,302,962 B2 | 5/2019 | Neitz et al. | |
| 10,429,670 B2 | 10/2019 | Newman | |
| 10,571,717 B2 | 2/2020 | Neitz et al. | |
| 10,787,707 B2 | 9/2020 | Neitz et al. | |
| 10,795,181 B2 | 10/2020 | Neitz et al. | |
| 10,884,264 B2 | 1/2021 | Hones et al. | |
| 11,048,102 B2 | 6/2021 | Neitz | |
| 11,693,257 B2 * | 7/2023 | Zheleznyak | G02C 7/044 351/159.79 |
| 2002/0140900 A1 | 10/2002 | Streibig | |
| 2003/0082576 A1 | 5/2003 | Jones | |
| 2004/0110179 A1 | 6/2004 | Shuber | |
| 2004/0150787 A1 | 8/2004 | Niculas | |
| 2005/0208555 A1 | 9/2005 | Raimond | |
| 2006/0082729 A1 | 4/2006 | To et al. | |
| 2006/0235428 A1 | 10/2006 | Silvestrini | |
| 2006/0285071 A1 | 12/2006 | Erickson et al. | |
| 2007/0026167 A1 | 2/2007 | Bourdelais et al. | |
| 2007/0115431 A1 | 5/2007 | Smith et al. | |
| 2007/0247588 A1 | 10/2007 | Cano | |
| 2007/0296916 A1 | 12/2007 | Holden et al. | |
| 2008/0030675 A1 | 2/2008 | Dillon | |
| 2008/0084534 A1 | 4/2008 | Lindacher et al. | |
| 2008/0151183 A1 | 6/2008 | Altmann | |
| 2008/0221674 A1 | 9/2008 | Blum | |
| 2008/0273170 A1 | 11/2008 | Watanabe | |
| 2008/0309882 A1 | 12/2008 | Thom et al. | |
| 2009/0059168 A1 | 3/2009 | Miller et al. | |
| 2010/0021889 A1 | 1/2010 | Juo | |
| 2010/0091240 A1 | 4/2010 | Drobe et al. | |
| 2010/0102025 A1 | 4/2010 | Eagerton | |
| 2010/0141729 A1 | 6/2010 | Petsch et al. | |
| 2010/0149488 A1 | 6/2010 | Lo et al. | |
| 2011/0051079 A1 | 3/2011 | Martinez et al. | |
| 2011/0058143 A1 * | 3/2011 | Gupta | G02C 7/061 351/159.42 |
| 2011/0194195 A1 | 8/2011 | Zalevsky et al. | |
| 2011/0259860 A1 | 10/2011 | Bass et al. | |
| 2011/0313058 A1 | 12/2011 | Neitz et al. | |
| 2012/0014977 A1 | 1/2012 | Furihata | |
| 2012/0026456 A1 | 2/2012 | Nishimoto et al. | |
| 2012/0062836 A1 | 3/2012 | Tse et al. | |
| 2012/0182520 A1 | 7/2012 | Neitz et al. | |
| 2013/0053425 A1 | 2/2013 | To et al. | |
| 2013/0103147 A1 | 4/2013 | Christie et al. | |
| 2013/0107206 A1 | 5/2013 | Slater | |
| 2014/0080900 A1 | 3/2014 | Neitz et al. | |
| 2014/0111763 A1 | 4/2014 | Griffin | |
| 2015/0036102 A1 | 2/2015 | Ghosh et al. | |
| 2015/0109574 A1 | 4/2015 | Tse et al. | |
| 2015/0111782 A1 | 4/2015 | Neitz et al. | |
| 2015/0151500 A1 | 6/2015 | Yin et al. | |
| 2015/0316788 A1 | 11/2015 | Holden et al. | |
| 2015/0331255 A1 | 11/2015 | Sankaridurg et al. | |
| 2016/0026000 A1 | 1/2016 | Kester | |
| 2016/0143801 A1 | 5/2016 | Lam et al. | |
| 2016/0306192 A1 | 10/2016 | Marshall et al. | |
| 2016/0377884 A1 | 12/2016 | Lau et al. | |
| 2017/0115509 A1 | 4/2017 | Brennan et al. | |
| 2017/0131567 A1 | 5/2017 | To et al. | |
| 2017/0168320 A1 | 6/2017 | Tsubota et al. | |

(56) References Cited

U.S. PATENT DOCUMENTS

| | | |
|---|---|---|
| 2017/0184875 A1 | 6/2017 | Newman |
| 2017/0189168 A1 | 7/2017 | Zickler et al. |
| 2017/0192252 A1 | 7/2017 | Brennan et al. |
| 2017/0276963 A1 | 9/2017 | Brennan et al. |
| 2017/0292160 A1 | 10/2017 | Neitz et al. |
| 2017/0336653 A1 | 11/2017 | Bakaraju |
| 2018/0024378 A1 | 1/2018 | Kreiss et al. |
| 2018/0079158 A1 | 3/2018 | Qiu et al. |
| 2018/0112268 A1 | 4/2018 | Neitz et al. |
| 2018/0275425 A1 | 9/2018 | Collins et al. |
| 2018/0275427 A1 | 9/2018 | Lau et al. |
| 2019/0033619 A1 | 1/2019 | Neitz et al. |
| 2019/0038373 A1 | 2/2019 | Jung |
| 2019/0235279 A1 | 8/2019 | Hones et al. |
| 2019/0302477 A1 | 10/2019 | Neitz et al. |
| 2020/0073147 A1 | 3/2020 | Bakaraju et al. |
| 2020/0089023 A1 | 3/2020 | Zhou et al. |
| 2020/0241325 A1 | 7/2020 | Chalberg et al. |
| 2020/0271955 A1 | 8/2020 | Neitz et al. |
| 2020/0393699 A1 | 12/2020 | Neitz |
| 2021/0165244 A1 | 6/2021 | Hones et al. |
| 2021/0341753 A1 | 11/2021 | Neitz |

FOREIGN PATENT DOCUMENTS

| | | |
|---|---|---|
| CN | 1479881 | 3/2004 |
| CN | 1909860 | 2/2007 |
| CN | 2924572 | 7/2007 |
| CN | 101198434 | 6/2008 |
| CN | 101273882 | 10/2008 |
| CN | 101595420 | 12/2009 |
| CN | 101730500 | 6/2010 |
| CN | 102238927 | 11/2011 |
| CN | 103097940 | 5/2013 |
| CN | 103959138 | 7/2014 |
| CN | 104094164 | 10/2014 |
| CN | 104094165 | 10/2014 |
| CN | 104678572 | 6/2015 |
| CN | 105378545 | 3/2016 |
| CN | 102892380 | 10/2016 |
| DE | 19524391 | 1/1996 |
| EP | 0457612 | 11/1991 |
| EP | 1799166 | 6/2007 |
| EP | 2131721 | 12/2009 |
| EP | 2548533 | 7/2011 |
| EP | 2616876 | 7/2013 |
| EP | 2962155 | 1/2016 |
| EP | 3667401 | 6/2020 |
| HK | 1210838 | 5/2016 |
| JP | S5829627 | 2/1983 |
| JP | 2004514921 | 5/2004 |
| JP | 2008040497 | 2/2008 |
| JP | 2008514318 | 5/2008 |
| JP | 4891249 | 3/2012 |
| JP | 2013537317 | 9/2013 |
| JP | 2017510851 | 4/2017 |
| JP | 2019529968 | 10/2019 |
| JP | 2012513252 | 7/2021 |
| KR | 100686551 | 2/2007 |
| KR | 100840845 | 6/2008 |
| TW | 279510 | 6/1996 |
| TW | 201211618 | 3/2012 |
| TW | 201307942 | 2/2013 |
| TW | I530727 | 4/2016 |
| TW | I559044 | 11/2016 |
| TW | I561885 | 12/2016 |
| WO | WO1986006846 | 11/1986 |
| WO | WO1997031286 | 8/1997 |
| WO | WO1999066366 | 12/1999 |
| WO | WO2000052516 | 9/2000 |
| WO | WO2002031585 | 4/2002 |
| WO | WO2006034652 | 4/2006 |
| WO | WO2006113149 | 10/2006 |
| WO | WO2007082268 | 7/2007 |
| WO | WO2008026674 | 3/2008 |
| WO | WO2008045847 | 4/2008 |
| WO | WO2008059178 | 5/2008 |
| WO | WO2008083418 | 7/2008 |
| WO | WO2008106802 | 9/2008 |
| WO | WO2010019397 | 2/2010 |
| WO | WO2010075319 | 7/2010 |
| WO | WO2010088644 | 8/2010 |
| WO | WO2007132834 | 11/2011 |
| WO | WO2012034265 | 3/2012 |
| WO | WO2013015743 | 1/2013 |
| WO | WO2013082545 | 6/2013 |
| WO | WO2013134825 | 9/2013 |
| WO | WO2014194444 | 12/2014 |
| WO | WO2015055322 | 4/2015 |
| WO | WO2015147758 | 10/2015 |
| WO | WO2015186723 | 12/2015 |
| WO | WO2017178430 | 10/2017 |
| WO | WO2018026697 | 2/2018 |
| WO | WO2018076057 | 5/2018 |
| WO | WO2018167099 | 9/2018 |
| WO | WO2018208724 | 11/2018 |
| WO | WO2019166653 | 9/2019 |
| WO | WO2020138127 | 7/2020 |

OTHER PUBLICATIONS

Applied Biosystems—Product Bulletin—Automated DNA Sequencing [online] "ABI Prism® BigDyeTM Primer Sequencing Kit," 2000, available via url: <tools.thermofisher.com/content/sfs/brochures/cms_040730.pdf>, 4 pages.

Carkeet et al., "Repeatability of IOLMaster Biometry in Children, Optometry and Vision Science", Nov. 2004, 81(11) : 829-834.

Carroll et al., "Estimates of L:M cone ratio from ERG flicker photometry and genetics", Journal of Vision, 2002, 2(8):531-542.

Carroll et al., "Cone photoreceptor mosaic disruption associated with Cys203 Arg mutation in the M-cone opsin," Proceedings of the National Academy of Sciences of the United States of America, 2009, 106(49):20948-20953.

Carroll, et al., "Functional photoreceptor loss revealed with adaptive optics: An alternate cause of color blindness," Proceedings of the National Academy of Sciences of the United States of America, 2004, 101(22):8461-8466.

Carroll, J., McMahon, C., Neitz, M., & Neitz, J. (2000). Flicker-photometric electroretinogram estimates of L: M cone photoreceptor ratio in men with photopigment spectra derived from genetics. Journal of The Optical Society of America A, 17,499-509.

Crognale et al., "Characterization of a novel form of X-linked incomplete achromatopsia", Visual Neuroscience, 2004, 21(3):197-203.

Davidoff, "Cone opsin gene variants in color blindness and other vision disorders," 2015, Retrieved from the Internet: <https://digital.lib.washington.edu/researchworks/bitstream/handle/1773/33578/Davidoff_washington_0250E_15133.pdf?sequence=1&isAllowed=y>, 132 pages.

Drummond-Borg, et al., "Molecular patterns of X chromosome-linked color vision genes among 134 men of European ancestry," Proceedings of the National Academy of Sciences of the United States of America, Feb. 1989, 86:983-987.

Gardner et al., "Three Different Cone Opsin Gene Array Mutational Mechanisms with Genotype-Phenotype Correlation and Functional Investigation of Cone Opsin Variants" Human Mutation (2014) vol. 35(11), pp. 1354-1362.

GeneCards [online], "GeneCard for the OPN1MW gene", retrieved on Apr. 6, 2020, retrieved from <genecards.org/cgi-bin/carddisp_pl?gene=OPN1MW>, 27 pages.

Greenwald et al., "Role of a Dual Splicing and Amino Acid Code in Myopia, Cone Dysfunction and Cone Dystrophy Associated with L/M Opsin Interchange Mutations," Translation Vision Science & Technology, vol. 6, No. 3, dated May 10, 2017, 19 pages.

Gunther et al., "Individual differences in chromatic (red/green) contrast sensitivity are constrained by the relative number of L-versus M-cones in the eye", Vision Research, May 2002, 42(11):1367-1378.

(56) References Cited

OTHER PUBLICATIONS

Gwiazda et al., "A Randomized Clinical Trial of Progressive Addition Lenses versus Single Vision Lenses on the Progression of Myopia in Children", Investigative Ophthalmology & Visual Science, Apr. 2003, 44:1492-1500.
Hahner et al., "Strategies for SNP genotyping by mass spectrometry", International Congress Series, Jan. 2003, 1239: 11-16.
Halushka et al., "Patterns of single-nucleotide polymorphisms in candidate genes for blood-pressure homeostasis", Nat Genet. 1999, 239-247.
Hattersley DM et al., "What makes a good genetic association study?" The Lancet, Oct. 2005, 366(9493):1315-1323.
Hirschhorn et al. "A comprehensive review of genetic association studies", Genet Med, 2002, 45-61.
Hofer, et al., "Organization of the Human Trichromatic Cone Mosaic" Journal of Neuroscience, Oct. 19, 2005, 25(42):9669-9679.
International Preliminary Report on Patentability in International Appln. No. PCT/US2020/020702, dated Sep. 16, 2021, 10 pages.
International Search Report and Written Opinion in International Appln. No. PCT/US2020/020702, dated Jun. 10, 2020, 12 pages.
Kuchenbecker et al., "Topography of the long- to middle-wavelength sensitive cone ratio in the human retina assessed with a wide-field color multifocal electroretinogram", Vis Neurosci, May-Jun. 2008, 25(3):301-6.
Lucentini, "Gene association studies typically wrong: reproducible gene-disease associations are few and far between", The Scientist, 2004, 18(24): p. 20.
McClements et al., "The PROM1 mutation p.R373C causes an autosomal dominant bull's eye maculopathy associated with rod, rod-cone, and macular dystrophy," IOVS, 51(9): 4771-4780.
McClements, Michelle et al. Variations in Opsin Coding Sequences Cause X-Linked Cone Dysfunction Syndrome, with Myopia and Dichromacy Investigative Ophthalmology & Visual Science (2013) vol. 54(2), pp. 1361-1369.
McMahon et al., "The L:M cone ratio in males of African descent with normal color vision", Journal of Vision, 2008, 8(2):1-9.
Michaelides et al., "X-Linked Cone Dysfunction Syndrome with Myopia and Protanopia" Ophthalmology, Aug. 2005, 112(8): 1448-1454.
Michaelides, et al. (2010) "The PROM1 mutation p.R373C causes an autosomal dominant bull's eye maculopathy associated with rod, rod-cone, and macular dystrophy," IOVS, 51(9): 4771-4780.
Mizrahi-Meissonnier et al., "Variable Retinal Phenotypes Caused by Mutations in the X-Linked Photopigment Gene Array", Investigative Ophthalmology & Visual Science, Aug. 2010, (51):3884-3892.
Montana.edu [online], "Optical System Design", retrieved on Nov. 1, 2021, retrieved from <http://www.montana.edu/jshaw/documents/18%20EELE582_S15_OTFMTF.pdf >, 18 pages.
Mummidi et al., "Evolution of Human and Non-human Primate CC Chemokine Receptor 5 Gene and mRNA,Potential Roles for Haplotype and mRNA Diversity, Differential Haplotype-Specific Transcriptional Activity, and Altered Transcription Factor Binding to Polymorphic Nucleotides in the Pathogenesis of HIV-1 and Simian Immunodeficiency Virus*210", Journal of Biological Chemistry, 2000, 275(25):18946-18961.
Nathans et al., "Molecular Genetics of Human Blue Cone Monochromacy", Aug. 1989, 45(4920): pp. 831-838.
Nathans et al., "Molecular Genetics of Inherited Variation in Human Color Vision", Apr. 1986, 232(4747): pp. 203-210.
NCBI Database GenBank Accession No. NM 020061. Nov. 1, 2009. National Center for Biotechnology Information, National Library of Medicine, Bethesda, MD, USA), 7 pages.
Neitz et al. "Variety of genotypes in males diagnosed as dichromatic on a conventional clinical anomaloscope", Visual Neuroscience, 2004, 21(3):205-216.
Neitz et al., "Cone mosaic disruption caused by L/M opsin mutations in bornholm eye disease," ARVO Annual Meeting Abstract, Apr. 2011, 2 pages.
Neitz et al., "Polymorphism in the number of genes encoding long-wavelength-sensitive cone pigments among males with normal color vision", Vision Research, Sep. 1995, 35(17): 2395-2407.
Neitz, "A new mass screening test for color-vision deficiencies in children" Color Research & Application, 2001, 26(1): S239-S249.
Oda, et al. (2003) "Analysis of L-cone/M-cone visual pigment gene arrays in females by long-range PCR" Vision Research, vol. 43, pp. 489-495.
Okada et al., "Target Spatial Frequency Determines the Response to Conflicting Defocus- and Convergence-Driven Accommodative Stimuli," 2006, Elsevier, vol. 46, pp. 475-484.
Radhakrishna, et al., "The 'X-linked' severe form of myopia locus at Xq28 (MYP1): Narrowing of the critical region and exclusion of twelve known genes localized in the interval.", ARVO Annual Meeting Abstract, May 2005, 1 page.
Scholl, et al., (2001) "Macular dystrophy with protan genotype and phenotype studied with cone type specific ERGs" Current Eye Research, vol. 22(3) pp. 221-228.
Scholl, et al., (2006) "Progressive cone dystrophy with deutan genotype and phenotype", Graefe's Arch Clin Exp Ophthalmol, vol. 244, pp. 183-191.
Schwartz et al., "X-linked myopia: Bornholm Eye Disease", Clinical Genetics, 1990, 38(4):281-286.
SLR Lounge [online], "Diffraction, Aperture, and Starburst Effects", retrieved on Nov. 1, 2021, retrieved from < https://www.slrlounge.com/diffraction-aperture-and-starburst-effects/ >, 9 pages.
Twelker et al., "Children's Ocular Components and Age, Gender, and Ethnicity", Optometry and Vision Science, Aug. 2009, 86(8):918-935.
Ueyama, Hisao et al. "Unique haplotype in exon 3 of cone opsin mRNA affects splicing of its precursor, leading to congenital color vision defect" Biochemical and Biophysical Research Communications (2012) vol. 424, pp. 152-157.
Verrelli et al., "Signatures of Selection and Gene Conversion Associated with Human Color Vision Variation", The American Journal of Human Genetics, 2004,75(3): 363-375.
Winderickx et al., "Defective colour vision associated with a missense mutation in the human green visual pigment gene", Nat Genet 1992, 251-256.
Winderickx, et al. (1993) "Haplotype diversity in the human red and green opsin genes: evidence for frequent sequence exchange in exon 3," Human Molecular Genetics, 2(9):1413-1421.
Young et al., "X-Linked High Myopia Associated With Cone Dysfunction", Arch Ophthalmol. 2004, 122(6):897-908s.
Young, et al., (2001) "Further refinement of the MYP2 locus for autosomal dominant high myopia by linkage disequilibrium analysis", Ophthalmic Genetics, vol. 22, pp. 69-75.
Blanco et al., "Fabrication of a microlens array in BK7 through laser ablation and thermal treatment techniques," Journal of Physics: Conference Series, Apr. 28, 2015, 605(1):1-6.
European Extended Search Report in European Application No. 20765920.2, dated Nov. 7, 2022, 19 pages.
Liu et al., "Photoetching of spherical microlenses on glasses using a femtosecond laser," Optics Communications, Oct. 15, 2020, 282(20):4119-4123.
Naessens et al., "Direct Writing of Microlenses in Polycarbonate with Excimer Laser Ablation," Applied Optics, Nov. 1, 2003, 42(31):6349-6359.
Shao et al., "Fabrication of large curvature microlens array using confined laser swelling method," Optics Letters, Aug. 15, 2013, 38(16):3044-3046.
Office Action in Chinese Appln. No. 202080024143.X, dated Mar. 12, 2024, 18 pages (with English translation).
Deng et al., "Research Hot Spots of Optical See-Through Augmented Reality Glasses," Journal of Shanghai Jiaotong University, Oct. 31, 2018, 52(10): 1255-1266 (English abstract only).
Office Action in Chinese Appln. No. 202080024143.X, dated Oct. 16, 2024, 11 pages (with English translation).

\* cited by examiner

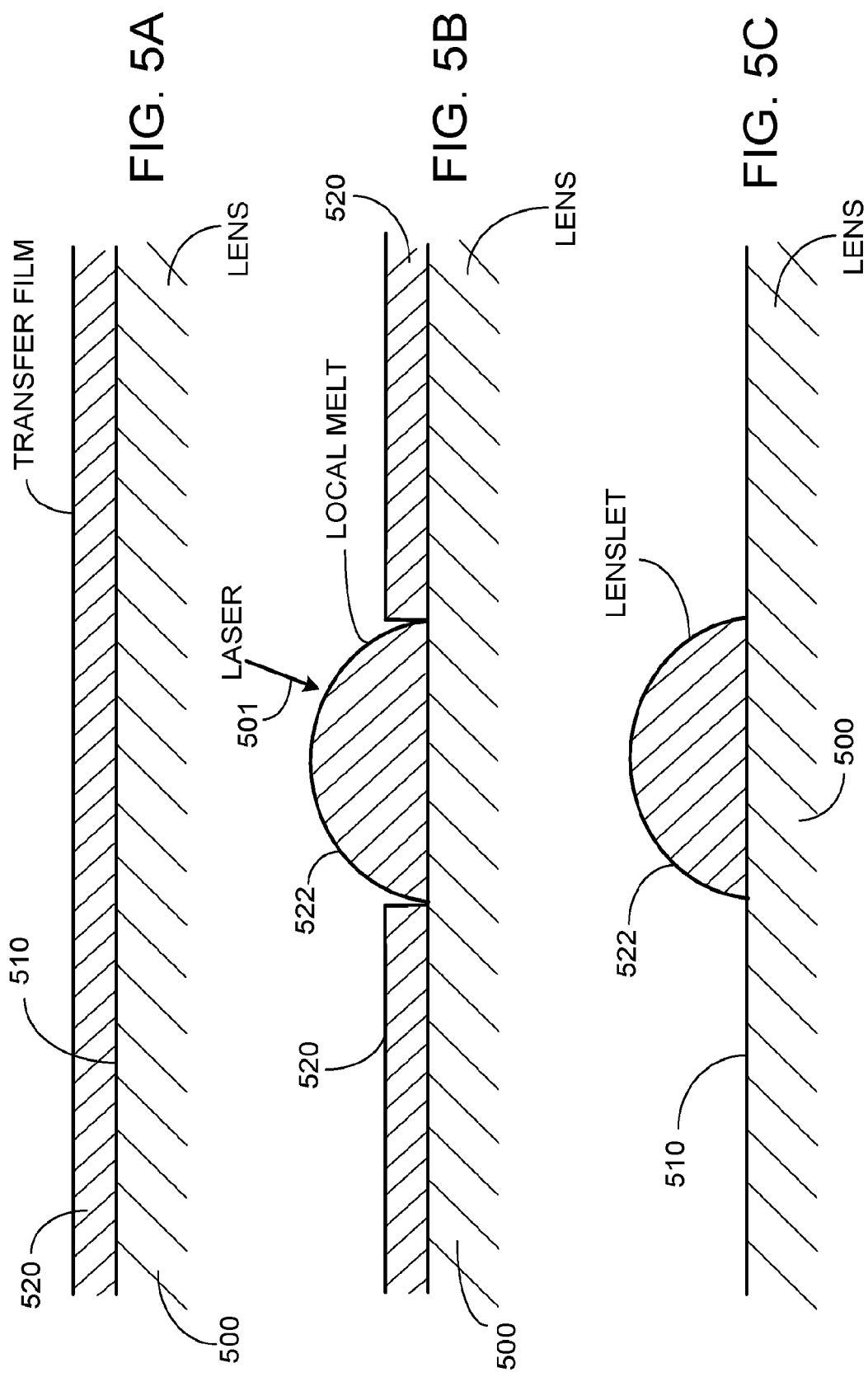

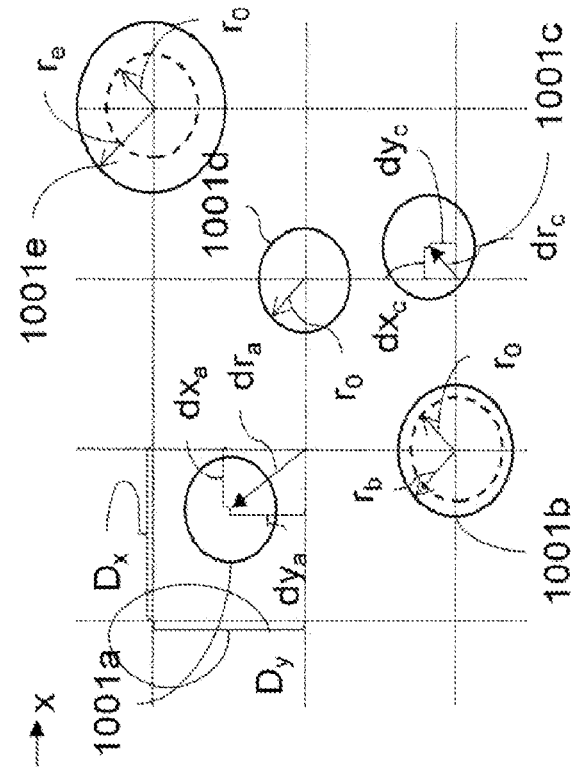
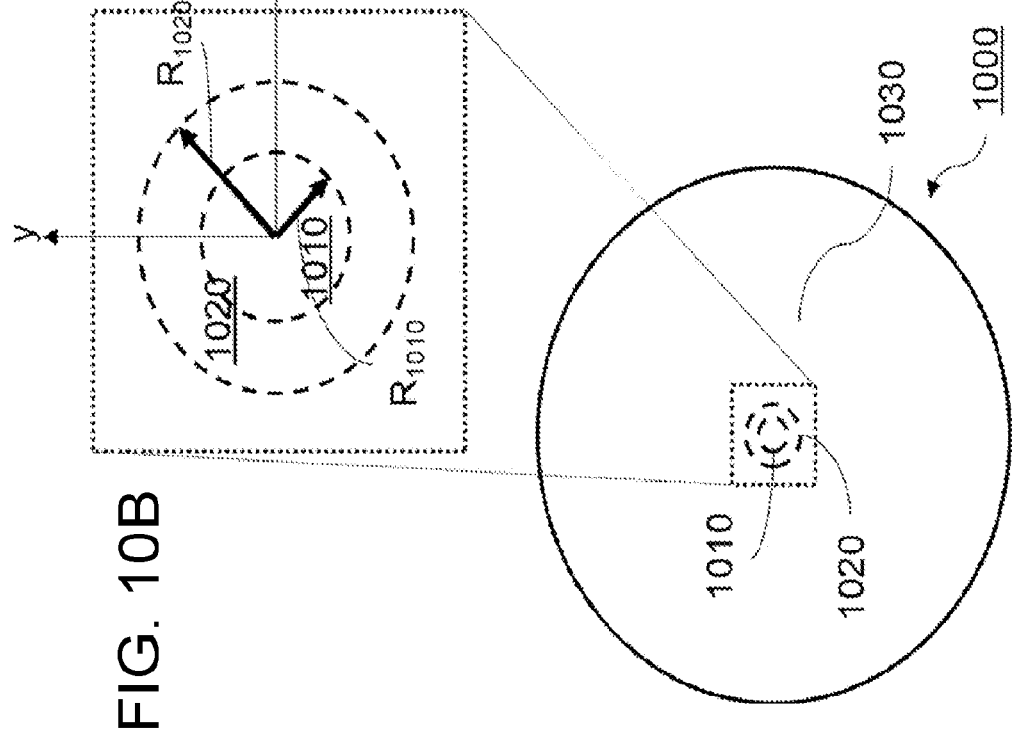
FIG. 10A
FIG. 10B
FIG. 10C

OPHTHALMIC LENSES FOR REDUCING MYOPIC PROGRESSION AND METHODS OF MAKING THE SAME

CROSS-REFERENCE TO RELATED APPLICATION

This application is a national phase entry under 35 U.S.C. 371 of PCT Application Serial No. PCT/US2020/020702, filed Mar. 2, 2020, which claims priority to U.S. Patent Application No. 62/812,639, filed on Mar. 1, 2019. The entirety of each of the foregoing is incorporated by reference.

BACKGROUND

The eye is an optical sensor in which light from external sources is focused, by a lens, onto the surface of the retina, an array of wavelength-dependent photosensors. The lens of the eye can accommodate by changing shape such that the focal length at which external light rays are optimally or near-optimally focused to produce inverted images on the surface of the retina that correspond to external images observed by the eye. The eye lens focuses light, optimally or near-optimally, emitted by, or reflected from external objects that lie within a certain range of distances from the eye, and less optimally focuses, or fails to focus objects that lie outside that range of distances.

In normal-sighted individuals, the axial length of the eye, or distance from the front of the cornea to the fovea of the retina, corresponds to a focal length for near-optimal focusing of distant objects. The eyes of normal-sighted individuals focus distant objects without nervous input to muscles which apply forces to alter the shape of the eye lens, a process referred to as "accommodation." Closer, nearby objects are focused, by normal individuals, as a result of accommodation.

Many people, however, suffer from eye-length-related disorders, such as myopia ("nearsightedness"). In myopic individuals, the axial length of the eye is longer than the axial length required to focus distant objects without accommodation. As a result, myopic individuals can view near objects at a certain distance clearly, but objects further away from that distance are blurry.

Typically, infants are born hyperopic, with eye lengths shorter than needed for optimal or near-optimal focusing of distant objects without accommodation. During normal development of the eye, referred to as "emmetropization," the axial length of the eye, relative to other dimensions of the eye, increases up to a length that provides near-optimal focusing of distant objects without accommodation. Ideally, biological processes maintain the near-optimal relative eye length to eye size (e.g., axial length) as the eye grows to final, adult size. However, in myopic individuals, the relative axial length of the eye to overall eye size continues to increase during development, past a length that provides near-optimal focusing of distant objects, leading to increasingly pronounced myopia.

It is believed that myopia is affected by environmental factors as well as genetic factors. Accordingly, myopia may be mitigated by therapeutic devices which address environmental factors. For example, therapeutic devices for treating eye-length related disorders, including myopia, are described in U.S. Pub. No. 2011/0313058A1.

SUMMARY

Techniques for forming optical elements on surfaces of conventional ophthalmic lenses (e.g., stock finished or semi-finished lenses) are described. The techniques involve exposing the ophthalmic lens at discrete locations to laser radiation to shape a material at the surface to yield an optical element such as a light scattering center or a lenslet. The techniques can include depositing one or more materials on the lens surface. The optical elements can be formed from, wholly or partly, from the one or more deposited materials. Optical elements can be sized, shaped, and distributed in a pattern making the ophthalmic lens suitable for treating eye-length related disorders.

Various aspects of the invention are summarized as follows.

In general, in one aspect, the invention features a method that includes providing an ophthalmic lens having a prescribed optical power, the ophthalmic lens having a surface having a base curvature corresponding to the prescribed optical power, and exposing a material at the surface to laser radiation sufficient to locally reshape the material to form a plurality of lenslets on the surface, the lenslets each having a corresponding optical power that differs from the prescribed optical power of the ophthalmic lens (e.g., the optical power of the lenslets can be higher or lower than the prescribed optical power).

Implementations of the method can include one or more of the following features. For example, exposing the material at the surface includes causing relative motion between a beam of the laser radiation at the surface to locally expose different areas of the surface to the laser radiation. Each lenslet can be formed by moving the beam in a spiral path at each lenslet location on the surface. Each lenslet can be formed by moving the beam in one or more circular or elliptical paths at each lenslet location on the surface. The material at each lenslet location can be exposed to the laser radiation more than once. A power of the beam of laser radiation can be varied during the exposure of the material at each lens location. For example, each lenslet can be formed by moving the beam in two or more intercalated circular paths on the surface.

Exposing the material can include focusing a beam of the laser radiation to a spot of the surface of the ophthalmic lens. At the surface, the spot of the laser beam has a depth of field of at least 15 mm (e.g., 16 mm or more, 18 mm or more, 20 mm or more, such as 25 mm) in which a power density of the laser beam varies by 25% or less (e.g., 20% or less, 15% or less, 12% or less, 10% or less, 8% or less, 5% or less, such as 3%).

The material can be exposed to laser radiation sufficient to locally melt the material on the surface.

The material can be exposed to laser radiation sufficient to the cause a bubble to form in the material on the surface at a location of each lenslet.

One or more of the lenslets can have a spherical surface shape. Alternatively, or additionally, one or more lenslet has an aspherical surface shape. Alternatively, or additionally, one or more lenslet has a toroidal surface shape. Alternatively, or additionally, one or more lenslet has an atoric surface shape.

The method can include forming scattering centers on the surface of the ophthalmic lens. The scattering centers can be formed exposing the material at the surface to laser radiation sufficient to locally reshape the material to form the scattering centers on the surface.

The method can further include forming a layer of the material on the surface of the ophthalmic lens prior to exposing the material to the laser radiation.

The material on the surface can be different from a bulk material of the ophthalmic lens. In some embodiments, the material on the surface has a higher refractive index than the bulk material (e.g., 0.01 or more higher, 0.05 or more higher, 0.1 or more higher, 0.15 or more higher, 0.2 or more higher, such as 0.25 higher). Alternatively, the material on the surface can have a lower refractive index than the bulk material (e.g., 0.01 or more lower, 0.05 or more lower, 0.1 or more lower, 0.15 or more lower, 0.2 or more lower, such as 0.25 lower).

The material can be a bulk material of the lens.

In general, in another aspect, the invention features a device that includes an ophthalmic lens having a prescribed optical power, the ophthalmic lens having a surface having a base curvature corresponding to the prescribed optical power, one or more optical elements formed in or supported by the surface, each optical element providing an optical effect different from the prescribed optical power, and one or more layers of material coated on the surface, each optical element being located at a discontinuity in the one or more layers of material.

Embodiments of the device can include one or more of the following features and can be formed used the methods of other aspects. For example, in some embodiments, at least some of the optical elements are lenslets (e.g., for myopic defocus). In some cases, at least some of the optical elements are scattering centers. In certain embodiments, the optical elements include both myopic defocus lenslets and scattering centers. The myopic defocus lenses and scattering centers can occupy mutually exclusive areas of the surface. Alternatively, or additionally, at least some of the myopic defocus lenses and scattering centers occupy a common area of the surface.

The one or more layers of material can include a hardcoat layer. The one or more layers of material can include an antireflection layer.

In certain aspects, the invention features eyeglasses including the device. For example, two of the devices can be used for the lenses in the eyeglasses. The two devices can have the same arrangement of optical elements, or different. The two devices can have the same base curvature, or the base curvatures can be different.

In general in a further aspect, the invention features another method, including coating a layer of a first material on a surface of an ophthalmic lens, exposing the layer of the first material to laser radiation sufficient to remove the first material from discrete locations of the layer and form pits in the surface of the ophthalmic lens at those locations, after exposing the layer of the first material, depositing a second material over the layer of the first material, wherein the second material fills the pits in the surface of the ophthalmic lens, and after depositing the second material, removing the layer of the first material from the surface of the ophthalmic lens to provide a pattern of spaced apart regions of the second material on the surface of the ophthalmic lens.

Implementations of the method can include one or more of the features of other aspects.

In general, in another aspect, the invention features a further method, including exposing discrete locations on a surface of an ophthalmic lens to laser radiation sufficient to form pits in the surface of the ophthalmic lens at those locations, and depositing a first material in the pits in the surface of the ophthalmic lens to provide light scattering centers or lenslets in the lens.

Implementations of the method can include one or more of the following features and/or features of other aspects. For example, providing the light scattering centers or lenslets further includes removing residual first material on the lens surface outside of the pits.

The first material can be deposited after the discrete locations are exposed.

The exposure and deposition can be synchronized so deposition commences before exposure is complete. Exposure and deposition can sequentially form and then deposit material in each pit before forming a subsequent pit. The synchronized exposure and deposition can be performed by simultaneously moving relative to the lens surface a laser and print nozzle that are fixed relative to each other.

The deposition can involve depositing discrete volumes of the first material in the pits.

Among other advantages, the disclosed techniques can be used to efficiently manufacture ophthalmic lenses for reducing myopic progression having a variety of patterns on a variety of different lens surfaces. The amount of scattering and/or myopic defocus can be easily individualized by varying the nature of each optical element formed on the lens surface as well as their density and distribution. For example, exposure parameters for a lens surface or a material on the lens surface to laser radiation can be programmed to sequentially and rapidly form a variety of optical elements such as lenslets or scattering centers on a lens surface. Furthermore, the manufacturing techniques can be economically deployed, at least compared to techniques that involve molding optical elements on a lens surface, because a single laser exposure system can be used to form a variety of different optical elements in a variety of different configurations.

BRIEF DESCRIPTION OF THE DRAWINGS

FIGS. 5A-5C are schematic diagrams showing cross-sections of structures formed during the example method shown in FIG. 4.

FIGS. 10A-10C show another example pattern of optical elements for an ophthalmic lens for reducing myopic progression.

In the figures, like numerals indicate similar elements.

DETAILED DESCRIPTION

Figure 1:
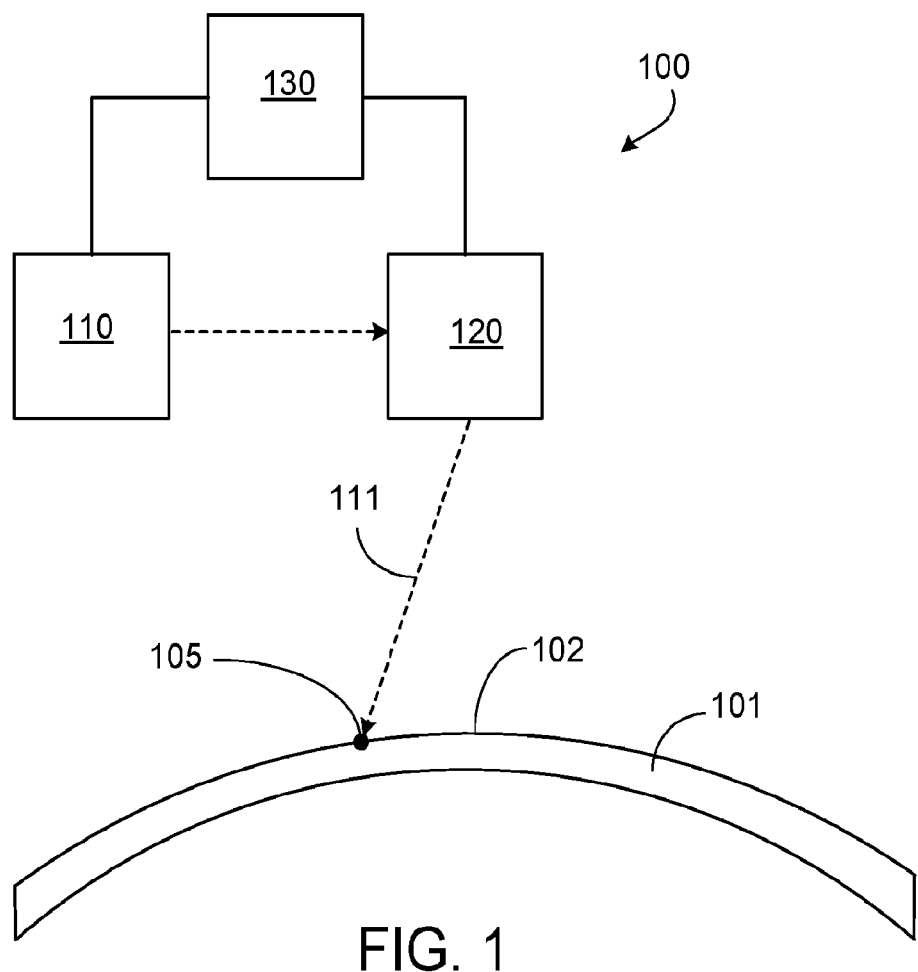
FIG. 1 is a schematic diagram showing an example laser system for forming optical elements on a surface of an ophthalmic lens.

Referring to FIG. 1, a laser system 100 for forming an optical element 105 on a surface 102 of a conventional ophthalmic lens 101 includes a laser 110 and a beam directing assembly 120 both in communication with a controller 130 (e.g., a computer controller). Laser 110 directs a laser beam towards beam directing assembly, which directs and focuses the beam 111 towards lens 101 which is positioned relative to assembly 120 by a stage (not shown). For example, beam directing assembly 120 can include an actuated mirror and one or more lenses to vary the direction and focus of the laser radiation. Controller 130 coordinates the operation of laser 110 and beam directing assembly 120 to expose surface 102 to pulses of laser radiation at discrete locations on the lens to form optical elements in a predetermined pattern on the lens surface.

In some implementations, the stage also includes an actuator. The stage actuator can be a multi-axis actuator, e.g., moving the lens in two lateral dimensions orthogonal to the beam propagation direction. Alternatively, or additionally, the actuator can move the stage along the beam direction. Moving the stage along the beam direction can be used to maintain the exposed portion of the lens surface at the focal position of the beam, notwithstanding the curvature of the lens surface, thereby maintaining a substantially constant scattering center size across the lens surface. The stage actuator can also be controlled by controller 130, which coordinates this stage motion with the other elements of the system. In some embodiments, a stage actuator is used in place of the mirror actuator.

Beam directing assembly 120 can include optical elements for focusing laser beam 111 onto lens surface 102. In some embodiments, the optical elements can focus the beam so that it has a depth of focus sufficiently large so that the spot size of beam 111 at surface 102 does not vary significantly over the entire lens surface, notwithstanding the curvature of surface 102. For example, in some embodiments, the spot of laser beam 111 has a depth of field of at least 15 mm (e.g., 20 mm or more, 25 mm or more, up to 30 mm) in which a power density of the laser beam varies by 25% or less (e.g., 20% or less, 15% or less, 10% or less, such as about 5%).

Generally, laser 110 can be any appropriate type of laser capable of generating light with sufficient energy to change the state of a material at the surface of the lens. Gas lasers, chemical lasers, dye lasers, solid state lasers, and semiconductor lasers can be used. In some embodiments, infrared lasers, such as a $CO_2$ laser (having an emission wavelength at 9.4 μm or 10.6 μm) can be used. Commercially-available laser systems can be used such as, for example, $CO_2$ laser systems made by Universal Laser Systems, Inc. (Scottsdale, AZ), (e.g., the 60W VLS 4.60 system). In some embodiments, femtosecond lasers can be used. For example, a commercial femtosecond laser system such as those made by Trumpf (Santa Clara, CA) (e.g., as the TruMicro 2030 laser device of the TruLaser Station 5005) can be used to form a scattering center pattern of a desired shape and size. The burst mode of such a laser device can achieve burst energy that is much higher compared to the maximum energy of a single pulse, leading to higher ablation rates. This exemplary laser system can provide pulse duration of less than 400 femtoseconds with 50 μJ maximum pulse energy.

The pulse duration, pulse energy and beam path are typically selected to provide an optical element of a desired size and shape. For example, in some embodiments, laser 110 forms the predetermined pattern of optical elements on lens 101 by melting a material on the surface of lens 101 (e.g., laser etching). For example, laser 110 can heat up and melts a portion of material on lens 101 surface.

Lens 101 can be formed from a variety of suitable materials including, by way of example, acrylic, CR-39®, RAV 7®, MR™ Series materials (e.g., MR-8™, MR-7™, MR-10™ & MR-174™), polycarbonate (PC) or other plastics, polyamide (PA or optical nylon), RAVolution®, or Trivex®.

In some examples, optical elements are formed on Trivex lenses using a Trumpf Trumark 5000 marking laser station, equipped with a nanosecond UV laser at a pulse repetition rate of 20 kHZ. The laser station is operated at a scan speed of 100 to 1,000 mm/s and 50-100% output power.

Referring to FIG. 2 and FIGS. 3A-3D, patterns of optical elements can be formed on the surface of an ophthalmic lens using a process that includes the steps set forth in flowchart 200.

Figure 2:
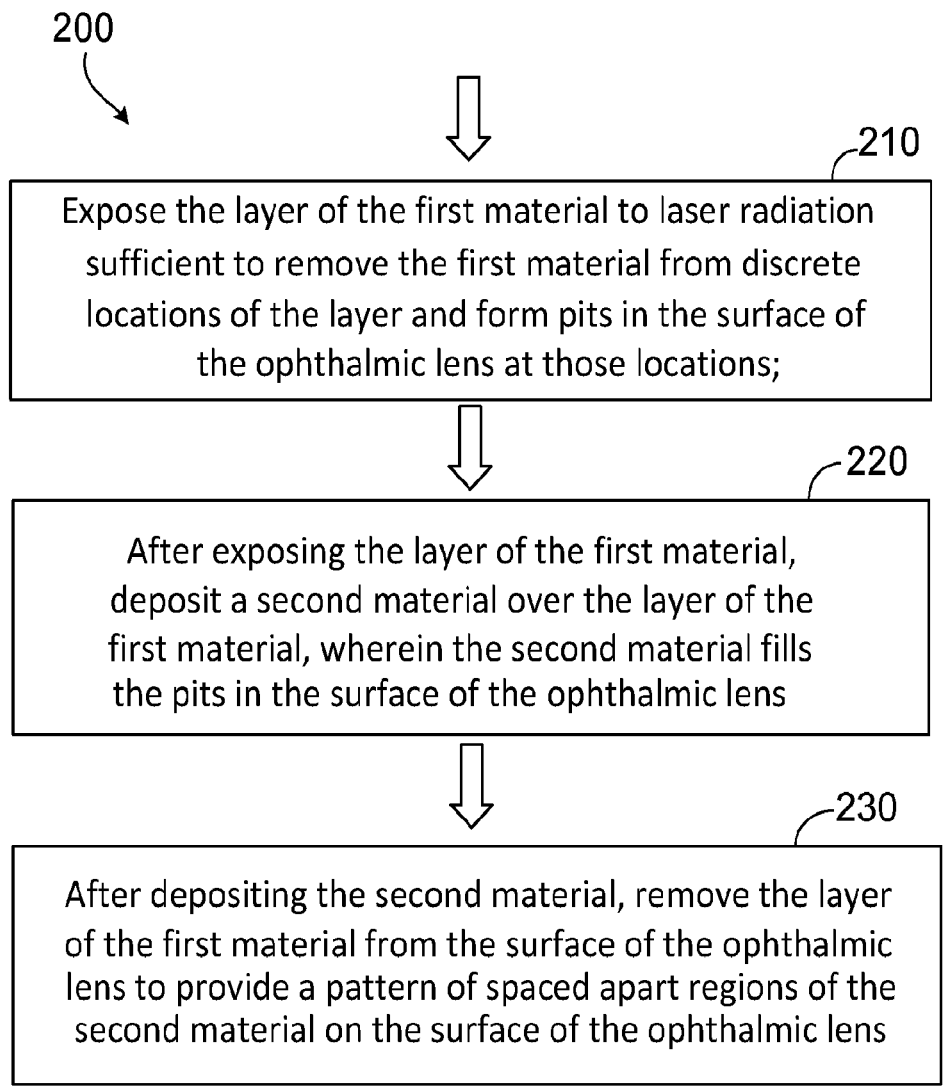
FIG. 2 is a flowchart showing various steps in an example method of forming optical elements on a surface of an ophthalmic lens using a laser system.
Figure 3A:
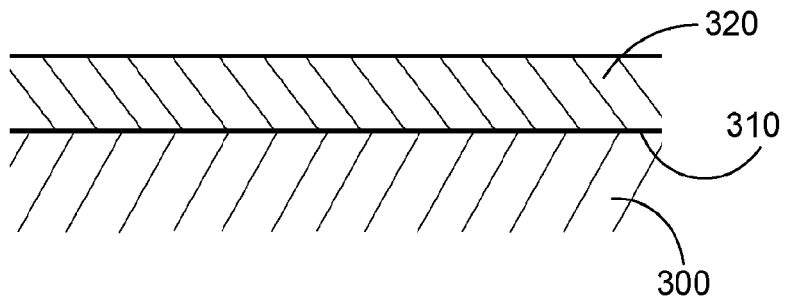
FIGS. 3A-3D are schematic diagrams showing cross-sections of structures formed during the example method shown in FIG. 2.

First, referring to FIG. 2 and specifically FIG. 3A, a layer of a sacrificial material 320 is deposited on a surface 310 of a lens 300 (step 210). The sacrificial material can be an organic material, such as an organic polymer. The sacrificial material can be a resist material. In some embodiments, the sacrificial material can be a hydrophobic and/or oleophobic material.

The sacrificial material can be deposited on the lens surface in a variety of ways. For instance, the sacrificial material can be coated on the lens surface (e.g., spin coated, dip coated, spray coated, knife coated). The sacrificial material can be printed on the lens surface (e.g., gravure printed, ink jetted).

The thickness of the sacrificial material layer can vary. Generally, the sacrificial material layer should be sufficiently thick to prevent deposition of deposit material (see below) on unexposed portions of the lens surface, but also sufficiently thin so that it can be readily removed by exposure to laser radiation. In some cases, the layer is relatively thin, e.g., 50 microns or less, 40 microns or less, 30 microns or less, 20 microns or less, 10 microns or less, 5 microns or less, 2 microns or less.

Figure 3B:
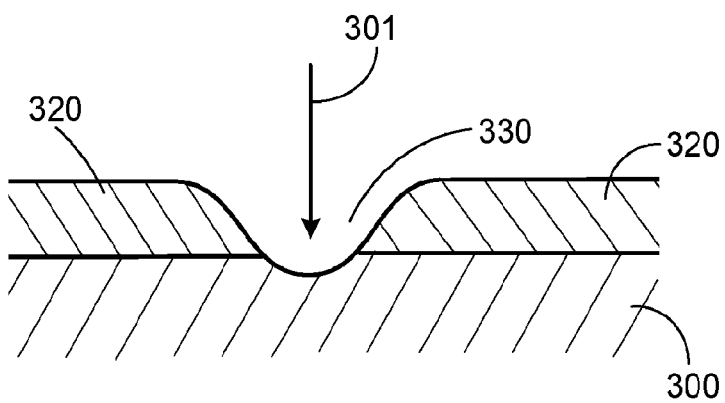

Referring to FIG. 2 and specifically FIG. 3B, after deposition, the layer of sacrificial material 320 is then exposed to a laser beam 301 having a wavelength and energy and for a duration sufficient to remove the sacrificial material and to form a pit 330 in the surface 310 of the lens 300 where the sacrificial material is removed. The type of laser used can vary and is selected to provide a beam sufficient to remove the sacrificial material and underlying lens material.

The laser beam is pulsed and scanned over the lens surface to create a pattern of holes in the layer of sacrificial material and pits in the lens surface. Exemplary patterns of pits are described below.

Generally, the size and shape of the pits can vary depending on the desired optical properties of the ophthalmic lens. In some embodiments, the pits are simply depressions in the lens surface, as illustrated in FIG. 3B. In certain embodiments, the pits are craters, with a raised rim. The pits depth and lateral dimensions can also vary. In some cases, the lateral dimension and the depth is approximately the same. Alternatively, the pits can have a greater depth than lateral dimension, or vice versa. In some embodiments, the pits have a lateral dimension of about 2 mm or less (e.g., 1 mm or less, 0.5 mm or less, 0.3 mm or less, 0.2 mm or less, 0.1 mm or less, 0.05 mm or less, 0.02 mm or less, 0.01 mm or less). In certain embodiments, the pits have a depth of 1 mm or less (e.g., 0.5 mm or less, 0.3 mm or less, 0.2 mm or less, 0.1 mm or less, 0.05 mm or less, 0.02 mm or less, 0.01 mm or less).

Figure 3C:
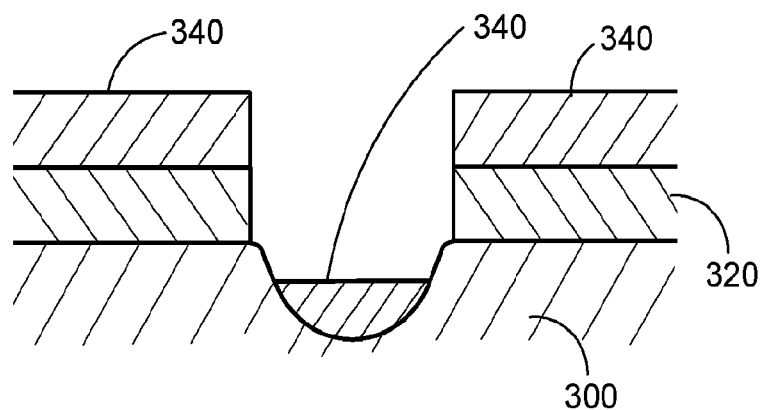

Referring to FIG. 2 and FIG. 3C specifically, in step 230, another material 340 (a "deposit material") is formed over the now-patterned layer of sacrificial material 320. This fills the exposed pits with the deposit material. A layer of the deposit material may also form on the remaining sacrificial material layer as shown in FIG. 3C, although adhesion to the sacrificial material is not necessary. In some embodiments, e.g., where the sacrificial material is hydrophobic or oleophobic, the sacrificial material can resist any adhesion of the deposit material.

The deposit material is selected so that the filled pits provide a desired optical effect in the ophthalmic lens. For example, the filled pits can provide light scattering to reduce image contrast for the lens user. As a further example, the filled pits can provide a lensing effect, providing myopic defocus of an image formed with light focused by the optical element formed by the filled pit. In some embodiments, the deposit material absorbs certain wavelengths of light, providing reduced light transmission for certain bands or across the entire visible spectrum. In some embodiments, the deposit material is transparent, transmitting all visible wavelengths substantially equally. In this case, the refractive index of the deposit material can be different from the refractive index of the lens material. Generally, the deposit material can be homogeneous or inhomogeneous (e.g., the deposit material can include a dispersion of scattering centers smaller than the pit size).

The deposit material can be deposited in the pits using any of a variety of deposition methods. In some cases, the deposit material can be coated (e.g., out of a solution, or in a fluid phase). Physical (e.g., sputtering or physical vapor deposition methods) or chemical deposition methods (e.g., chemical vapor deposition, atomic layer deposition) are also possible.

Post deposition steps are also possible. For example, in some embodiments, the deposit material can be cured or set by exposure to a curing agent (e.g., radiation, thermal, or chemical).

Generally, ultimately, the deposit material should sufficiently adhere to the pits so that pits remain filled with the material during ultimate use of the lens.

Figure 3D:
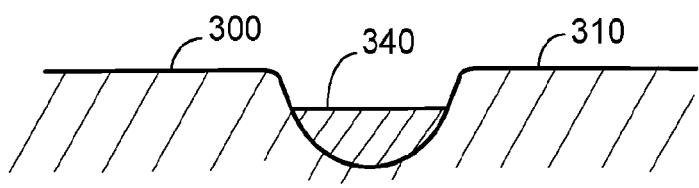

Finally, referring to FIG. 3 and FIG. 3D, in step 240, the deposit material 340 that remains on the layer of sacrificial material 320 is removed from the lens surface 310. In some embodiments, this step involves removing the remaining layer of sacrificial material from the lens surface. This can be done by exposing the layer to a solvent that dissolves the sacrificial material. Sacrificial material can also be removed by exposing the layer to a reagent that causes a chemical reaction in the sacrificial material that causes the layer to release from the lens surface. In some embodiments, the sacrificial layer can be removed by a thermal process. For instance, heating or cooling the material can cause it to release from the lens surface.

Sacrificial material removal process should not significantly affect the deposit material filling the pits in the lens surface. However, any deposit material remaining on the layer of sacrificial material is removed.

Alternatively, in some embodiments, the layer of sacrificial material is not removed but serves rather to prevent adhesion/facilitate removal of the deposit material to areas of the lens outside the pits. For example, the chemistry of the sacrificial material and deposit material can be selected so that the deposit material does not adhere to the sacrificial material and can be readily removed after the deposition step. For instance, after deposition, the deposit material can be wiped away or washed away from the layer of sacrificial material, but remains in the pits.

Additional steps are possible. For example, after removal of the excess deposit material, the lens surface can be polished to reduce any residual unevenness. Alternatively, or additionally, other layers can be formed on the lens surface (e.g., anti-reflection coatings and/or hard coats).

While the foregoing embodiments each include use of a layer of a sacrificial material, more generally the principles discussed above can be implemented without a sacrificial material layer at all. For example, in some embodiments, pits are formed in the lens surface directly (i.e., without first forming a layer of sacrificial material on the lens surface). Subsequently, the pits are filled with the deposit material in a manner that does not result in residual deposit material on the lens surface outside of the pits. For example, the deposit material can be applied by coating the lens surface with a liquid precursor, which is wiped away from the surface leaving behind deposit material only in the pits. The remaining deposit material can then be cured (e.g., by exposure to a curing agent, such as UV radiation) or otherwise set to adhere it within the pits.

Although the foregoing embodiments involve sequential coating and laser exposure steps, other implementations are possible. For example, in some embodiments, the deposition of a first material is synchronized with the creation of the pits on the lens surface. The first material is only deposited in the pit area, e.g., by inkjet printing and subsequently cured e.g. by UV radiation. The scan head can include one or more laser (e.g., delivered via an optical fiber), print nozzles and UV lamps. Those can be placed in parallel arrays, perpendicular to the scan direction, other arrangements are possible as long as they provide a known distance between laser and print nozzle. This enables a precise deposition of first material through the print nozzle into the pits that were just formed by the laser ahead of the nozzle in the same scan sweep. The timing of print nozzle activation is coordinated with the scan speed, and can, e.g., be triggered by the laser pulse.

In certain embodiments, the laser parameters (e.g., pulse energy, pulse duration, frequency) can be chosen to provide for surface roughness in the pit to promote adhesion of the first material in the pit. Ultrafast lasers, e.g., femto laser can leave a residual surface roughness of, e.g., 20 microns or less in the ablation pit, while leaving the surrounding area smooth. The first material and lens surface material can be selected so that the first material does not adhere sufficiently on the unexposed lens material, but has sufficient adhesion in the ablated pit (e.g., due to the surface roughness in the pit caused by the laser). Optionally, a curing step can further improve the adhesion in the ablated pit and/or promote delamination of the first material from the unexposed lens surface.

Inkjet printing of discrete scattering features on smooth ophthalmic lens material can lead to insufficient adhesion to withstand mechanical abrasion, e.g., when scratched with a sufficiently hard material. It is believed that Femto laser ablation, as an example, of a similar surface area compared to the intended feature provides for a recess in the lens material to accommodate a first material, which reduces the exposure to mechanical abrasion considerably. Additionally, surface roughness left by the femto laser ablation can promote adhesion of the first material.

The first material is typically chosen to exhibit a different refractive index (e.g., fluoropolymers at refractive indices as low as 1.3) compared to the lens material (1.5-1.74) to yield light scattering (e.g., diffractive scattering) due to the refractive index mismatch at the interface between lens and first material. Additionally, inclusions of gas bubbles or uneven surface of the ablation crater and first lens material to air can be used to increase light scattering at those features. Entrapped air bubbles can be created, e.g., if the first material does not completely wet the rough surface inside the ablation crater or during a consecutive curing process, which leads outgassing e.g., of a foaming agent. Using, e.g., a non-index matched optical transparent hard coating as first material may make unnecessary separate removal of the material from the smooth lens surface.

To allow for deposition of non-index matched material in one process step, UV inkjet printing operation can be enhanced with an additional preceding laser ablation step. For example, the printer scan head can be integrated with the UV inkjet system to ensure a precise deposition of ink in the ablation crater, followed by instant curing of a consecutive UV exposure (integrated as well in the print head). Using arrays of laser (e.g. fiber lasers or delivered via fibers) and consecutive print nozzles in parallel can reduce processing time since a larger area of lens surface is treated in one sweep. The number of lasers can be smaller than the number of print nozzles by using, e.g., a galvanometer laser scan head. In such cases, the geometric relationship between ablation crater, sweep speed and nozzle should be known and coordinated. The laser pulses used to ablate the material can be used to trigger opening of the print nozzle, by introducing a delay that accounts for the swept distance by the printer scan head, distance between nozzle and ablation crater and ink fluid dynamics.

Although the aforementioned embodiments involving the synchronized deposition of drops of material in areas of the lens exposed to laser radiation are in the context of creating ophthalmic lenses for reducing myopia progression, more generally, these techniques can be used in other applications too (e.g., on substrates other than ophthalmic lenses).

Figure 4:
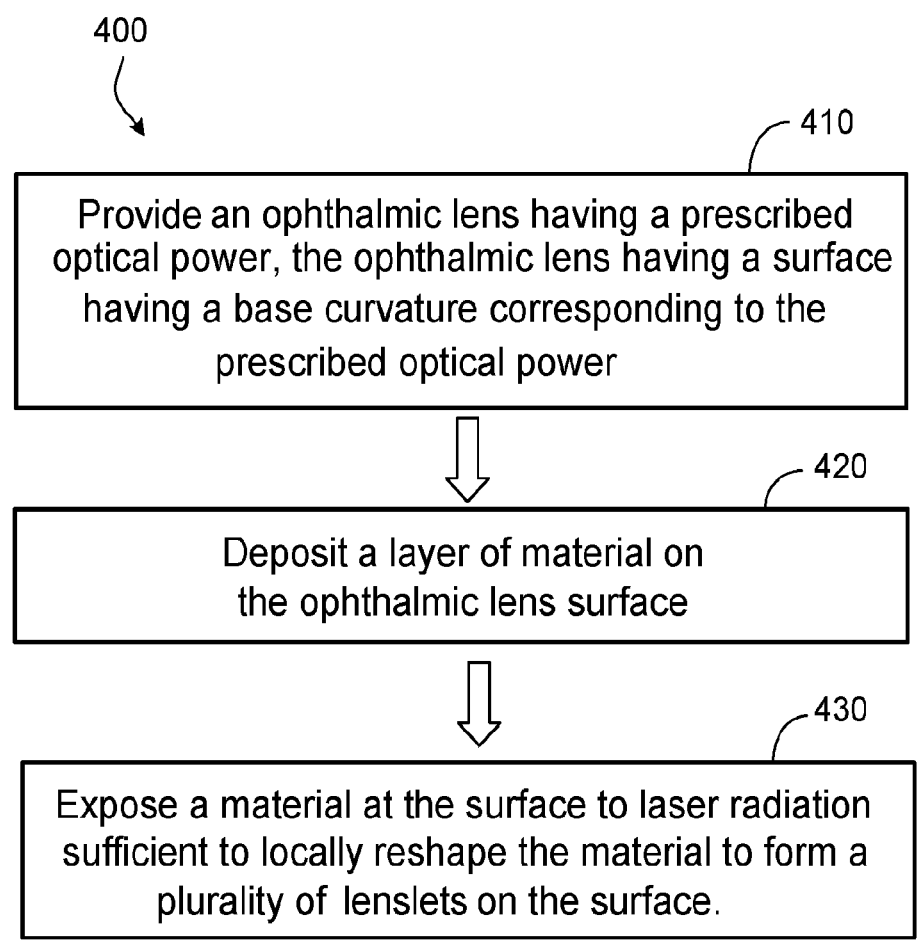
FIG. 4 is a flowchart showing various steps in another example method of forming optical elements on a surface of an ophthalmic lens using a laser system.

Referring to FIG. 4 and FIGS. 5A-5C, in certain implementations, a laser system can be used to reshape a material deposited on a surface of an ophthalmic lens into lenslets. A flowchart 400 showing steps in an example method is shown in FIG. 4 and FIGS. 5A-5C illustrate steps in this example. Referring to FIG. 4 and FIG. 5A specifically, in a first step 410, an ophthalmic lens 500 is selected. The ophthalmic lens 500 can have a prescribed optical power for a specific subject. Generally, the ophthalmic lens has a surface 510 or pair of surfaces with specific base curvatures corresponding to the prescribed optical power. The ophthalmic lens 500 can be a stock ophthalmic lens.

In step 420, a layer 520 of material is deposited onto surface 510 of the ophthalmic lens 500. Generally, the material can be any material suitable for forming a lenslet including suitable organic polymers or inorganic glass materials. The material can be deposited using any suitable method, such as those discussed above, for example. In some embodiments, the material can be deposited as a transfer film. For example, the material can be in the form of a film with an adhesive layer that adheres the layer of material to surface 510.

In some embodiments, intermediate layers can be formed on surface 510 before depositing layer 520. For example, one or more layers to promote adhesion of layer 520 to surface 510 can be deposited. Alternatively, or additionally, one or more layers to facilitate release of layer 520 can be deposited.

Referring to FIG. 4 and FIG. 5B specifically, in a subsequent step 430, exposing a material at the surface to laser radiation 501 sufficient to locally reshape the material to form lenslets 522 on surface 510. Lenslet 522 has an optical power different from the base power of lens 500 so that the lenslet provides myopic defocus of incident light for a user of the final lens.

In general, the laser exposure is controlled to change the shape of the material of layer 520 locally to form lens 522. For example, in some embodiments, the material forming layer 522 can be locally melted by the laser beam and coalesce to form a spherical or approximately spherical lenslet. The specific shape of the lenslet can be determined by the surface energy of the molten material and lens surface 510 as well as parameters of the laser exposure. Parameters of the laser exposure can include laser wavelength, laser power, spot size, scan speed, scan path, and pulse duration. In some cases, portions of layer 522 can be exposed to the laser radiation more than once in order to form a lenslet. Alternatively, or additionally, a power of the beam of laser radiation can be varied during the exposure of the material at each lens location.

The spot size of the laser at layer 520 can be smaller than the lateral size of the lenslet. For example, the spot diameter can be in a range from 10 µm to 500 µm and the lenslet can have a lateral dimension in a range from 500 µm to 3 mm, for example. In order to form the lenslet, the laser spot can be scanned over the lateral area of lenslet 522.

In some embodiments, the material of layer 520 is exposed to laser radiation sufficient to the cause a bubble to form in the material on the surface at a location of each lenslet.

In general, the shape of the lenslets can vary depending on a desired optical function of the lenslet. In some embodiments, spherical lenslets can be formed. Alternatively, or additionally, lenslets having an aspherical surface shape can be formed. In other examples, lenslets with a toroidal surface shape or an atoric surface shape can be formed.

The laser beam is scanned from lenslet location to lenslet location according to a lenslet pattern, resulting numerous lenslets across the surface of lens 500. Example lenslet patterns are described below.

Referring to FIG. 5C specifically, optionally, the remaining material of layer 520 can be removed from surface 510 of lens 500, leaving behind lenslet 522. For example, in cases where the layer 520 of material is applied to surface 510 using a transfer adhesive, the remaining material of the layer (i.e., that not reshaped into lenslets) can be simply peeled off lens surface 510. Alternative removal methods include the use of etchants, such as chemical or physical etchants.

In some embodiments, both lenslets and scattering centers can be formed on the same ophthalmic lens surface. In certain cases, lenslets and scattering centers can be formed in the same laser exposure process simply by varying the nature of the exposure (e.g., the exposure time, area, and/or power).

Figure 6A:
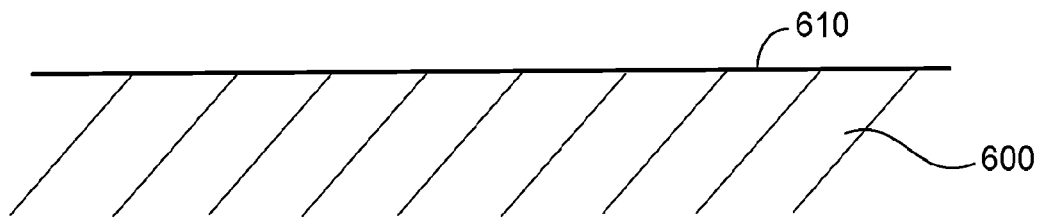
FIGS. 6A-6C are schematic diagrams showing cross-sections of structures formed during another example method of forming optical elements on a surface of an ophthalmic lens using a laser system.
Figure 6B:
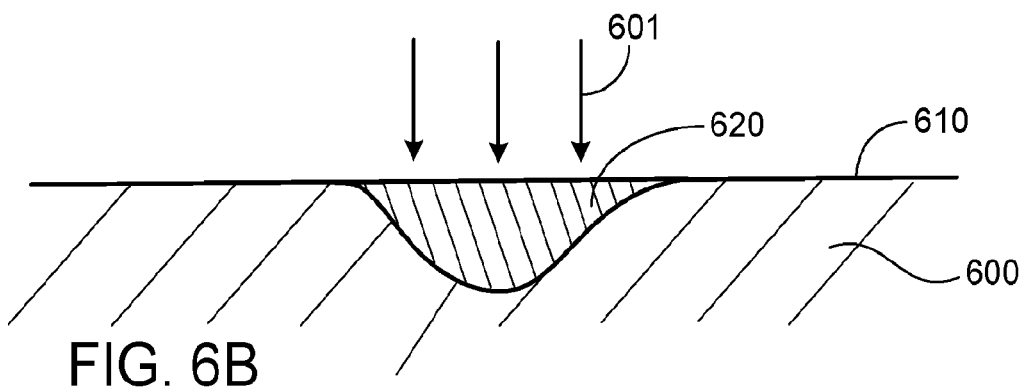
Figure 6C:
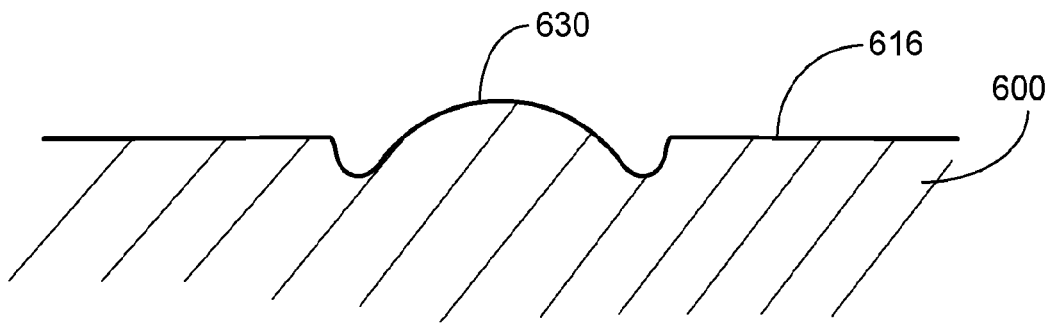
Figure 7A:
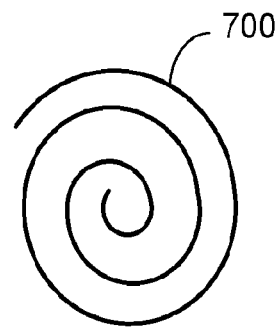
FIGS. 7A and 7B show laser beam spot paths for forming lenslets on a surface of an ophthalmic lens.
Figure 7B:
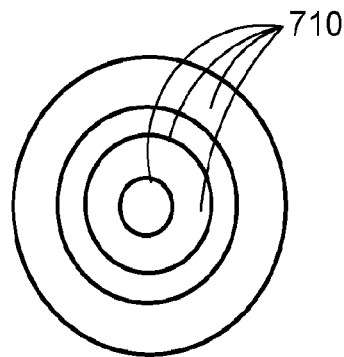

In some embodiments, optical elements can be formed simply by exposing the surface of the ophthalmic lens directly to the laser radiation, rather than a layer of material deposited on the lens surface. For example, referring to FIGS. 6A-6C, laser radiation 601 is used to form a lenslet 630 in a surface 610 of an ophthalmic lens 600. As shown in FIG. 6B, laser radiation 601 locally melts a portion 620 of lens 600, reshaping lens surface 610 at that portion to provide lenslet 630. For example, heating of the lens material can cause the molten material to expand, reshaping the lens surface.

Where the size of the optical element being formed is significantly larger that the spot size of the laser beam, the beam can be manipulated to trace a path over the area corresponding to the location of the optical element. Example laser beam paths are illustrated in FIGS. 7A and 7B. Specifically, FIG. 7A shows a spiral path 700 and FIG. 7B shows a path that is composed of a series of intercalated circles 710. Intercalated ellipses or other shapes are also possible. Generally, the number of passes around the lenslet axis (e.g., number of circles 710 in the path of FIG. 7B) depends, e.g., on the laser beam spot size and the lenslet size. Optionally, the laser can repeat similar pathways on the same spot, e.g., reducing the radius of the circle or spiral at each path to allow outer area of the forming lenslet to cool down while center is still in melt or remelted.

The laser beam pathway can be used to control melting and solidification dynamics to maximize protuberance or dip vertical height/depth of the lenslet being formed.

In some embodiments, optical features are formed on a conventional ophthalmic lens that includes one or more coated layers on the surface of the lens's bulk material. For example, the ophthalmic lens can include a hardcoat and/or an antireflection coating. Exposure to the laser beam can locally remove or restructure, e.g. via melting these coatings, resulting in a structure in which the optical features formed on the lens surface are in locations where the coating(s) is removed or restructured.

The laser beam pathway can be selected to control smoothness of the optical element surface, e.g., creating a rough surface to create scattering center, or a smooth surface to create lenslet. A rough surface can be created by modulating power density during the pathway, disturbing the formation of a smooth droplet and creating areas of different viscosity/temperature within the area under laser impact. Additionally, foaming of the material, by trapping gazes from outgazing or evaporation, which form gas bubbles in the material under a viscous solidifying surface layer.

Figure 8:
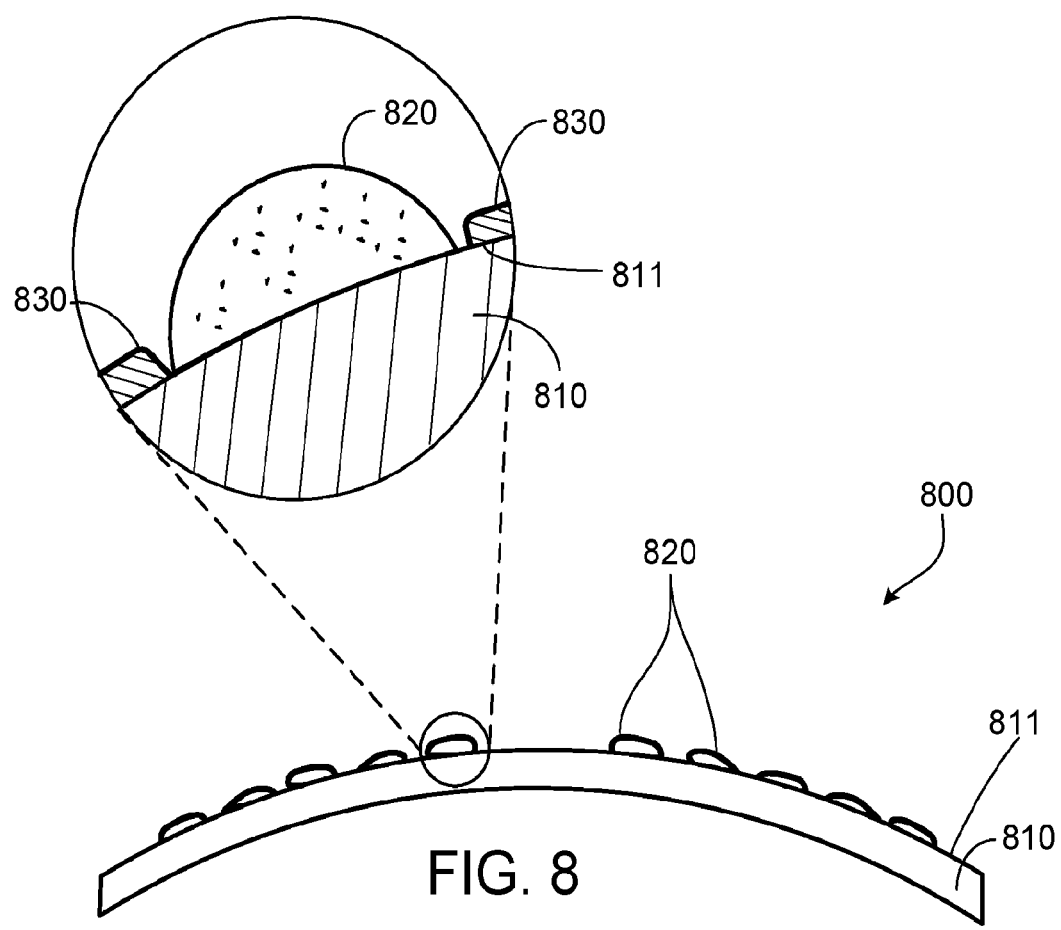
FIG. 8 is a schematic diagram showing in cross-section an example of an ophthalmic lens that includes optical elements formed on a surface.

An example of an ophthalmic lens having one or more layers of material coating on the lens surface that includes multiple lenslets at locations where the coatings are removed is illustrated in FIG. 8. Here, an ophthalmic lens 800 includes a conventional lens 810 having a prescribed optical power and a surface 811 having a surface having a base curvature corresponding to the prescribed optical power. Multiple lenslets 820 are formed in or supported by the surface. Lenslets 820 can be formed using the techniques described above. As illustrated in the inset to FIG. 8, surface 811 supports one or more coatings 830 (e.g., a hardcoat and/or an antireflection coating). Lenslets 820 are located in a corresponding discontinuity in coatings 830. The discontinuity can result from the formation process where the coatings are applied to the stock lens before laser exposure and the subsequent laser exposure locally removes the coatings before or while the lens surface is reshaped to form the lenslet.

While lens 800 features lenslets, scattering centers can be similarly provided in an ophthalmic lens with one or more coatings pre-applied.

Figure 9A:
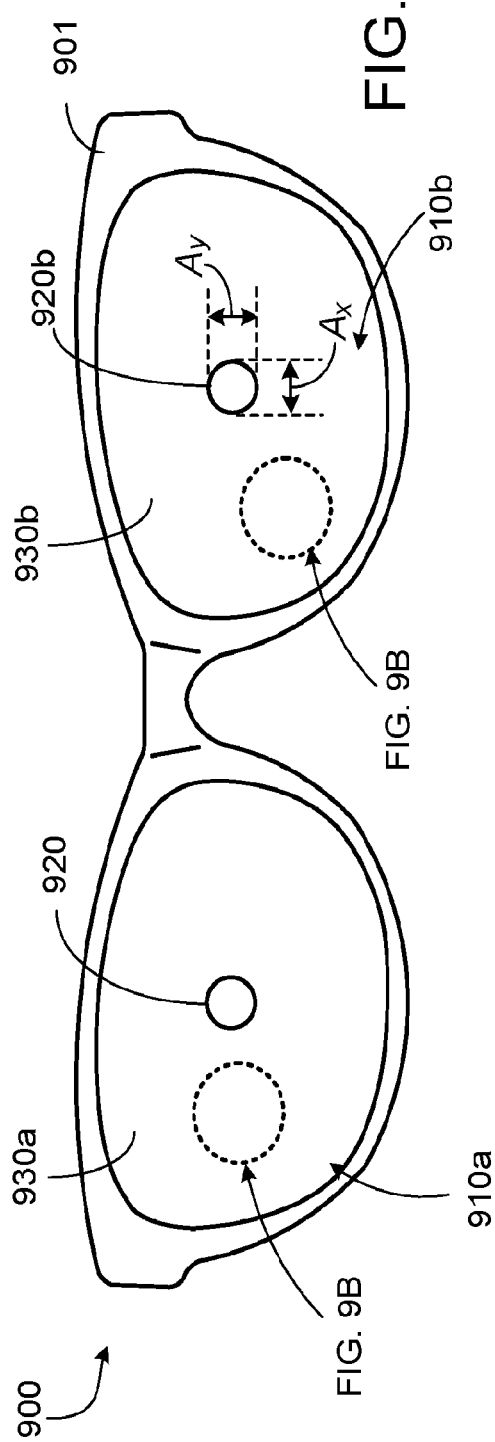
FIG. 9A shows an example of eyeglasses that include ophthalmic lenses with optical elements arranged for reducing myopic progression.

The resulting ophthalmic lenses can be used in eyeglasses useful in reducing myopia or other eye-lengthening disorders. For example, the techniques described above can be used for form optical elements on a circular lens blank which is subsequently shaped for fit a pair of eyeglass frames using conventional methods. Referring to FIG. 9A, myopia-reducing eyeglasses 900 are disclosed which allow treatment of both eyes simultaneously without substantially compromising clear vision. Moreover, the eyeglasses are sufficiently robust and inconspicuous as to allow a wearer to engage in the same day-to-day activities without the eyeglasses failing and without feeling self-conscious about their appearance, which is especially desirable because the eyeglasses are typically used to arrest eye-lengthening in children.

Figure 9B:
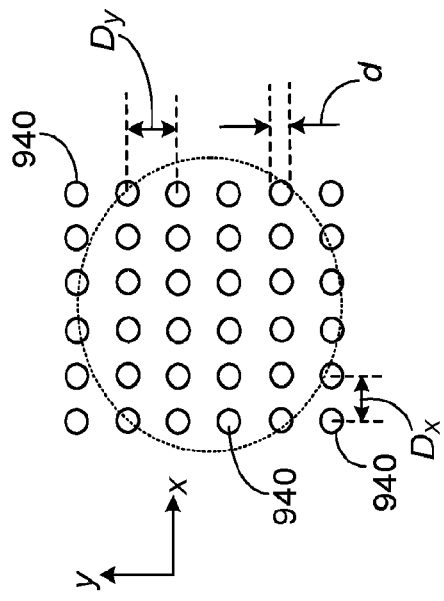
FIG. 9B shows an example pattern of optical elements for an ophthalmic lens for reducing myopic progression.
Figure 11A:
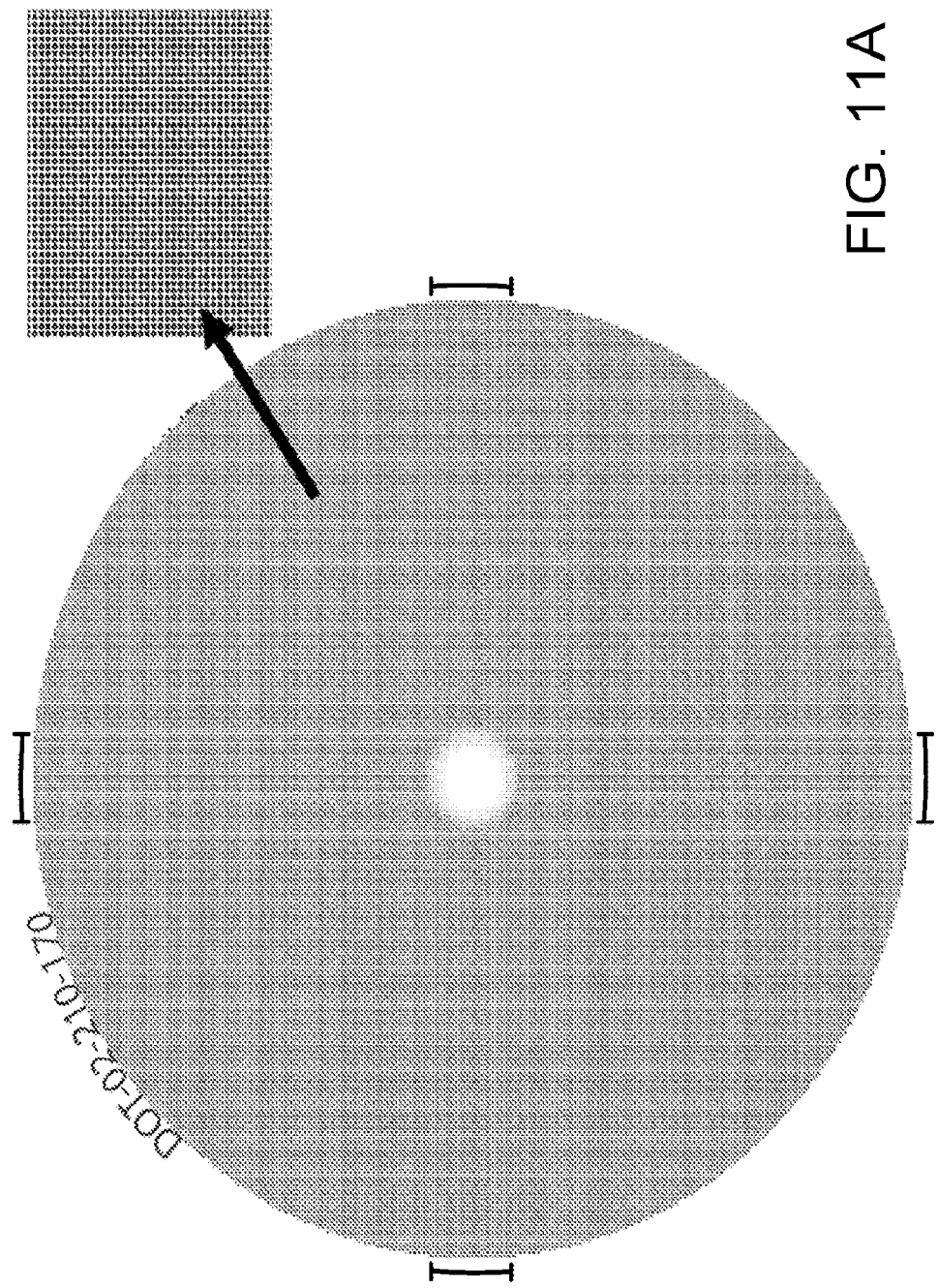
FIGS. 11A-11F show examples of scattering center patterns for an ophthalmic lens for reducing myopic progression.
Figure 11B:
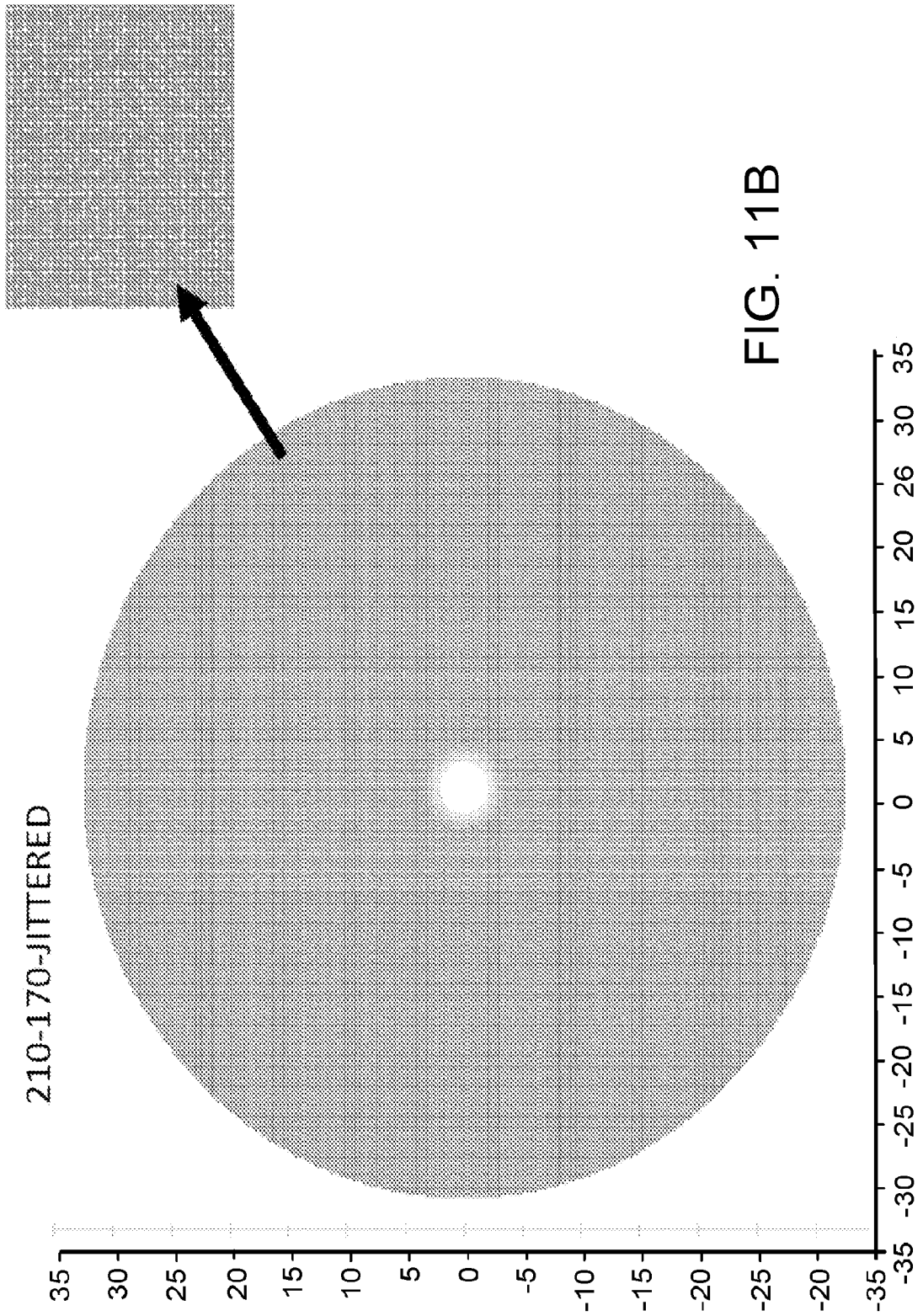
Figure 11C:
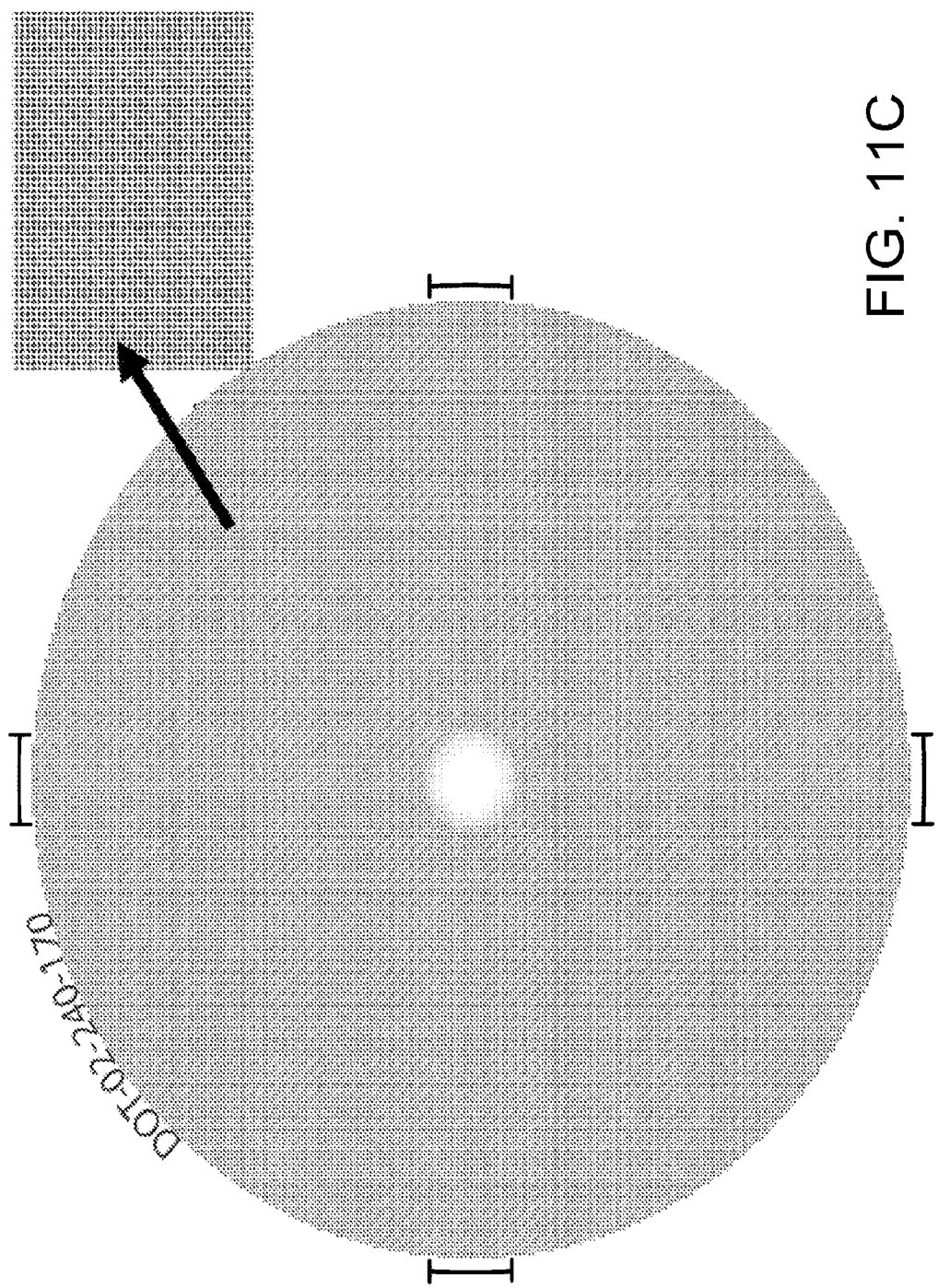
Figure 11D:
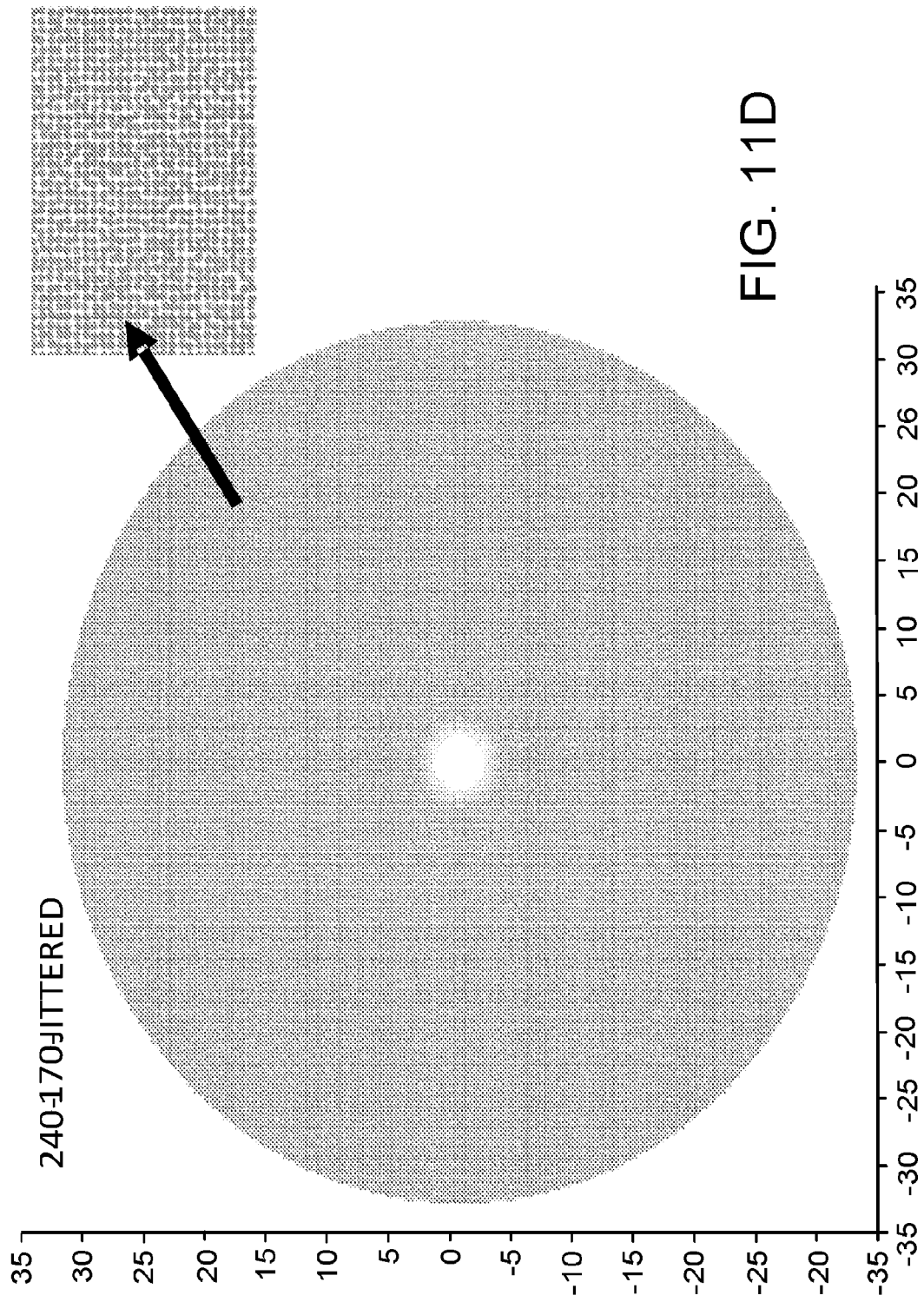
Figure 11E:
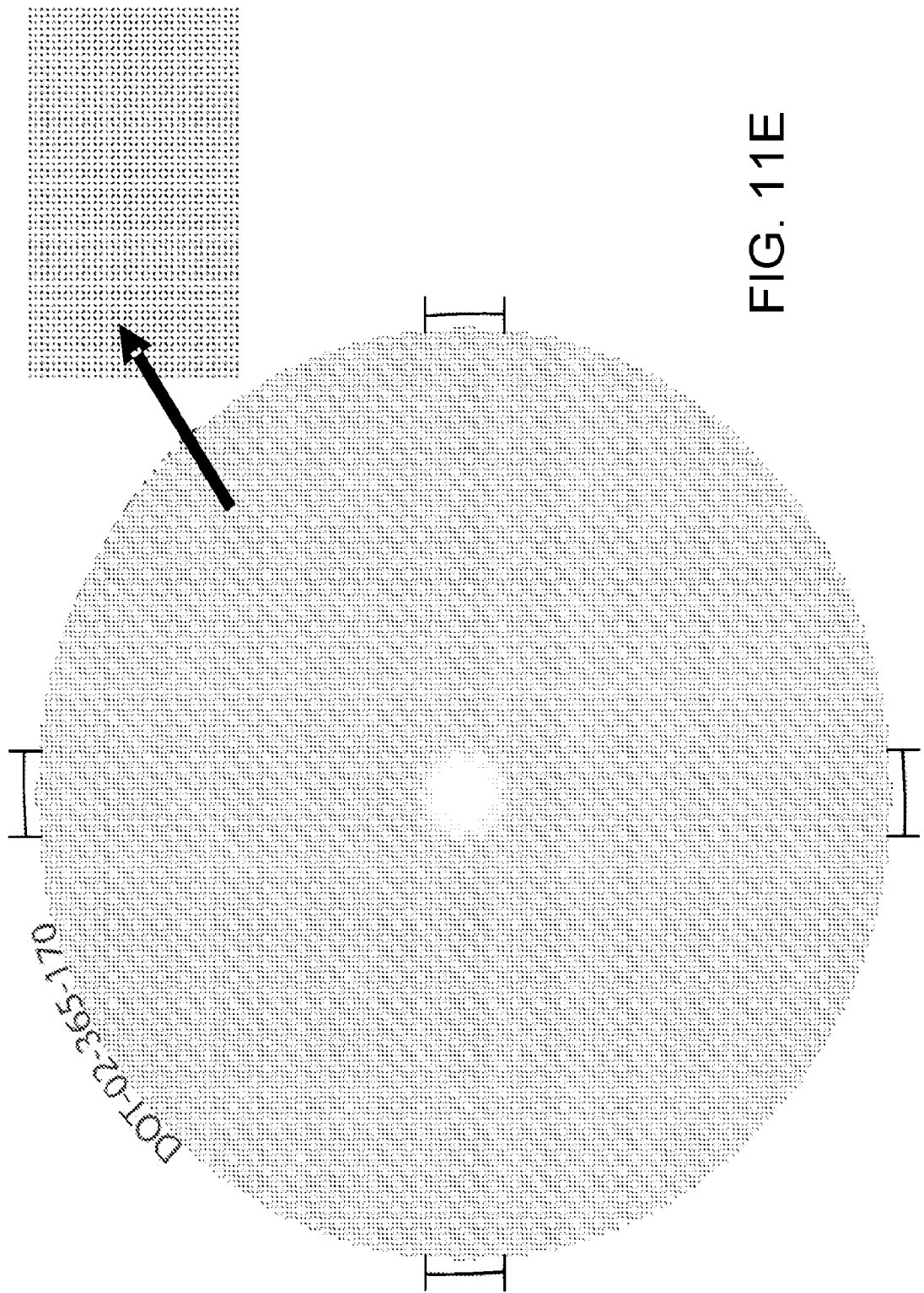
Figure 11F:
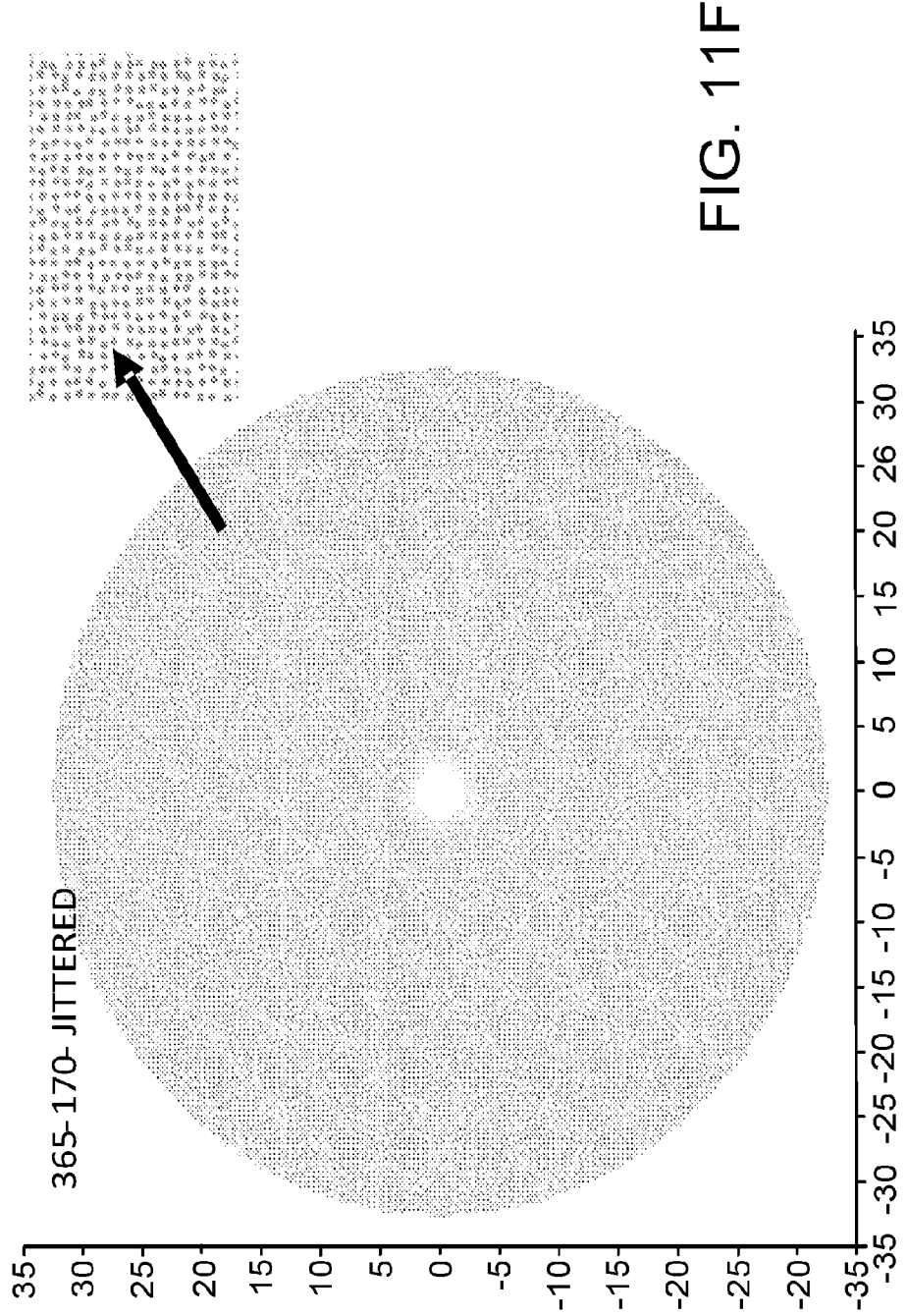

Myopia-reducing eyeglasses 900 are composed of a pair of frames 901 and ophthalmic lenses 910a and 910b mounted in the frames. Generally, the ophthalmic lenses can be plano lenses, single vision lenses (e.g., with positive or negative power) or multivision lenses (e.g., bifocals or progressive lenses). Ophthalmic lenses 910a and 910b each have a clear aperture 920a and 920b, respectively, surrounded by reduced-contrast areas 930a and 930b, respectively. Clear apertures 920a and 920b are positioned to coincide with the wearer's on-axis viewing position, while reduced contrast areas 930a and 930b correspond to the wearer's peripheral vision. Referring also to FIG. 9B, in the present example, reduced contrast areas 930a and 930b are composed of an array of scattering centers 940, which reduce the contrast of an object in the wearer's peripheral vision by scattering light passing through those areas to the wearer's eye. In general, scattering centers 940 can be provided by forming protrusions and/or recesses on one or both surfaces of each lens in areas 930a and 930b, and/or by forming scattering inclusions in the lens material itself in these areas. More generally, in other examples, reduced contrast areas can include lenslets instead of or in addition to scattering centers.

The size and shape of the clear aperture may vary. Generally, the clear aperture provides the wearer with a viewing cone for which their visual acuity may be optimally corrected (e.g., to 20/15 or 20/20). In some embodiments, the aperture has a maximum dimension (in the x-y plane) in a range from about 0.2 mm (e.g., about 0.3 mm or more, about 0.4 mm or more, about 0.5 mm or more, about 0.6 mm or more, about 0.7 mm or more, about 0.8 mm or more, about 0.9 mm or more) to about 1.5 cm (e.g., about 1.4 cm or less, about 1.3 cm or less, about 1.2 cm or less, about 1.1 cm or less, about 1 cm or less). Where the aperture is circular, e.g., as depicted in FIG. 9A, this dimension corresponds to the circle's diameter (i.e., $A_x = A_y$), however non-circular (e.g., elliptical, polygonal, $A_x \neq A_y$) apertures are also possible.

The clear aperture can subtend a solid angle of about 30 degrees or less (e.g., about 25 degrees or less, about 20 degrees or less, about 15 degrees or less, about 12 degrees or less, about 10 degrees or less, about 9 degrees or less, about 8 degrees or less, about 7 degrees or less, about 6 degrees or less, about 5 degrees or less, about 4 degrees or less, about 3 degrees or less) in the viewer's visual field. The solid angles subtended in the horizontal and vertical viewing planes may be the same or different.

In general, the scattering center patterns in reduced-contrast areas 930a and 930b can be selected based on a variety of design parameters to provide a desired degree of light scattering on the user's retina. Generally, these design parameters include the scattering center density, their size and shape, and their refractive index, for example, and are discussed in more detail below. Ideally, the scattering center patterns are selected to provide high visual acuity on the fovea and reduced image contrast on other parts of the retina with sufficiently low discomfort to the wearer to allow for extended, continuous wear. For instance, it can be desirable for children to be comfortable wearing the eyeglasses for most, if not all, of a day. Alternatively, or additionally, scattering center patterns can be designed for specific tasks, especially tasks which are believed to strongly promote eyelength growth, e.g., video gaming, reading or other wide angle, high contrast image exposure. For example, in such situations (e.g., where the user experiences high contrast in their peripheral vision and/or situations that do not require the wearer to move and to orient themselves using peripheral vision), the scattering intensity and scatter angle in the periphery can be increased, while considerations of consciousness and self-esteem may be less of a concern. This can lead to a higher efficiency in peripheral contrast reduction in such high contrast environment.

It is believed that reduced image contrast on the fovea of the user's eye is less efficient at controlling eye growth than reducing image contrast on other parts of the user's retina. Accordingly, the scattering center pattern can be tailored to reduce (e.g., minimize) light scattered into the user's fovea, while relatively more of the light on other parts of the retina is scattered light. The amount of scattered light on the fovea can be affected by the size of clear apertures 920a and 920b, respectively, but also by the nature of the scattering centers, especially those closest to the clear apertures. In some embodiments, for example, the scattering centers closest to the clear apertures can be designed for less efficient light scattering than those further away. Alternatively, or additionally, in some embodiments scattering centers closest to the clear apertures can be designed for smaller angle forward scattering that those further from the aperture.

In certain embodiments, scattering centers can be designed to deliver reduced narrow angle scattering and increased wide angle scattering to create even light distribution on retina/low contrast signal, while preserving acuity through geometry of scattering centers. For example, the scattering centers can be designed to generate significant wide forward angle scattering (e.g., such as more than 10%, 20% or more, 30% or more, 40% or more, 50% or more, deflected by more than 2.5 deg.). Narrow angle forward scattering, i.e., within 2.5 deg., can be kept relatively low (e.g., 50% or less, 40% or less, 30% or less, 20% or less).

In general, a variety of different metrics can be used to evaluate the performance of scattering center patterns in order to optimize them for use in myopia reducing eyeglasses. For example, scattering center patterns can be optimized empirically, e.g., based on physical measurements of lenses with different scattering center patterns. For example, light scattering can be characterized based on haze measurements, such as international test standards for haze (e.g., ASTM D1003 and BS EN ISO 13468). Conventional hazemeters can be used, e.g., a BYK-Gardner haze meter (such as the Haze-Gard Plus instrument) that measures how much light is totally transmitted through a lens, the amount of light transmitted undisturbed (e.g., within 0.5 deg.), how much is deflected more than 2.5 deg., and clarity (amount within 2.5 deg.). Other equipment can also be used to characterize light scattering for purposes of empirically optimizing scattering patterns. For example, equipment which measures light diffusion by measuring light in annular ring around 2.5 deg. can be used (e.g., equipment from Hornell).

Alternatively, or additionally, scattering center patterns can be optimized by computer modelling software (e.g., Zemax or Code V).

In some embodiments, scattering center patterns can be designed based on optimization of a point spread function, which is a representation of an image of the scattering center on the retina. For example, the size, shape, and spacing of the scattering centers can be varied to evenly spread illumination of retina such that the retina outside of fovea is homogeneously blanketed with scattered light to reduce (e.g., minimize) contrast at this region of the retina.

In some embodiments, the optimization of light scattering blanketing the peripheral retina accentuates the intensity of scattered light vs. undisturbed light in certain areas of the retina to more strongly suppress high contrast images. High contrast images, e.g., reading black and white text, tend to stem more from the lower half of the visual orbit. Therefore, a stronger blanketing of the upper retinal orbit with scattered light can be beneficial to reduce the signal for axial length growth, while reducing the visual impact, e.g., glare or halos, on the upper visual orbit.

Alternatively, or additionally, scattering center patterns can be designed based on optimization of a modulation transfer function, which refers to the spatial frequency response of the human visual system. For instance, the size, shape, and spacing of the scattering centers can be varied to smoothen attenuation of a range of spatial frequencies. Design parameters of the scattering center pattern can be varied in order to increase or decrease certain spatial frequencies as desired. Generally, the spatial frequencies of interest for vision are 18 cycles per deg. on the fine side, and 1.5 cycles per deg. on the course side. Scattering center patterns can be designed to provide increased signal at certain subsets of spatial frequencies within this range.

The aforementioned metrics can be used to evaluate scattering center patterns based on the size and/or shape of the scattering centers, both of which can be varied as desired. For example, the scattering centers can be substantially round (e.g., spherical), elongate (e.g., ellipsoidal), or irregularly-shaped. Generally, the scattering centers should have a dimension (e.g., diameter, as depicted in FIG. 9B) that is sufficient large to scatter visible light, yet sufficiently small so as not to be resolved by the wearer during normal use. For example, the scattering centers can have a dimension (as measured in the x-y plane) in a range from about 0.001 mm or more (e.g., about 0.005 mm or more, about 0.01 mm or more, about 0.015 mm or more, about 0.02 mm or more, about 0.025 mm or more, about 0.03 mm or more, about 0.035 mm or more, about 0.04 mm or more, about 0.045 mm or more, about 0.05 mm or more, about 0.055 mm or more, about 0.06 mm or more, about 0.07 mm or more, about 0.08 mm or more, about 0.09 mm or more, about 0.1 mm) to about 1 mm or less (e.g., about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm).

Note that for smaller scattering centers, e.g., having a dimension that is comparable to the wavelength of light (e.g., 0.001 mm to about 0.05 mm), the light scattering may be considered Raleigh or Mie scattering. For larger optical elements, e.g., about 0.1 mm or more, light scattering may be due to geometric scattering.

In general, the dimension of the scattering centers may be the same across each lens or may vary. For example, the dimension may increase or decrease as a function of the location of the scattering center, e.g., as measured from the clear aperture and/or as a function of distance from an edge of the lens. In some embodiments, the scattering center dimensions vary monotonically as the distance from the center of the lens increases (e.g., monotonically increase or monotonically decrease). In some cases, monotonic increase/decrease in dimension includes varying the diameter of the scattering centers linearly as a function of the distance from the center of the lens.

The scattering centers shown in FIG. 9B are arranged on a square grid, spaced apart by a uniform amount in each direction. This is shown by $D_y$ in the y-direction and $D_x$ in the x-direction. In general, the scattering centers are spaced so that, collectively, they provide sufficient contrast reduction in the viewer's periphery for reducing myopic progression. Typically, smaller scattering center spacing will result in greater contrast reduction (provided adjacent scattering centers do not overlap or merge). In general, $D_x$ and $D_y$ are in a range from about 0.05 mm (e.g., about 0.1 mm or more, about 0.15 mm or more, about 0.2 mm or more, about 0.25 mm or more, about 0.3 mm or more, about 0.35 mm or more, about 0.4 mm or more, about 0.45 mm or more, about 0.5 mm or more, about 0.55 mm or more, about 0.6 mm or more, about 0.65 mm or more, about 0.7 mm or more, about 0.75 mm or more) to about 2 mm (e.g., about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1 mm or less, about 0.9 mm or less, about 0.8 mm or less). As an example, scattering center spacing can be 0.55 mm, 0.365 mm, or 0.240 mm.

The shape of scattering centers can be selected to provide an appropriate light scattering profile. For example, the scattering centers can be substantially spherical or aspherical. In some embodiments, scattering centers can be elongated in one direction (e.g., in the horizontal or vertical direction), such as in the case of elliptical centers. In some embodiments, the centers are irregular in shape.

While the scattering centers shown in FIG. 9B are arranged with equal spacing in the x- and y-directions, more generally spacing in each direction may be different. Furthermore, scattering centers may be arrayed in grids that are not square. For example, hexagonal grids (e.g., hexagonally close packed) may be used. Non-regular arrays are also possible, e.g., random or semi-random scattering center placement may be used. In the case of a random pattern dimensions given would be the average separation of the scattering centers in x- and y-directions.

Generally, the distribution of scattering centers in a lens's scattering area can vary to provide an appropriate level of light scattering. In some embodiments, scattering centers are arranged in a regular array, e.g., on a square grid, spaced apart by a uniform amount in each direction. In general, the scattering centers are spaced so that, collectively, they provide sufficient contrast reduction in the viewer's periphery for reducing myopic progression. Typically, smaller spacing between scattering centers will result in greater contrast reduction (provided adjacent scattering centers do not overlap or merge). In general, scattering centers can be spaced from their nearest neighbor by an amount in a range from about 0.05 mm (e.g., about 0.1 mm or more, about 0.15 mm or more, about 0.2 mm or more, about 0.25 mm or more, about 0.3 mm or more, about 0.35 mm or more, about 0.4 mm or more, about 0.45 mm or more, about 0.5 mm or more, about 0.55 mm or more, about 0.6 mm or more, about 0.65 mm or more, about 0.7 mm or more, about 0.75 mm or more) to about 2 mm (e.g., about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1 mm or less, about 0.9 mm or less, about 0.8 mm or less). As an example, spacing can be 0.55 mm, 0.365 mm, or 0.240 mm.

It is believed that light from a scene that is incident on the lens in reduced contrast areas 930a/b between the scattering centers contributes to a recognizable image of the scene on the user's retina, while light from the scene incident on the scattering centers does not. Moreover, at least some of the light incident on the scattering centers is transmitted to the retina, so has the effect of reducing image contrast without substantially reducing light intensity at the retina. Accordingly, it is believed that the amount of contrast reduction in the user's peripheral field of view is correlated to (e.g., is approximately proportional to) the proportion of the surface area of the reduced-contrast areas covered by the scattering centers.

In general, the coverage of a lens by scattering centers can vary as desired. Here, coverage refers to the proportion of the lens's total area, as projected onto the x-y plane that corresponds to a scattering center. Typically, a lower scattering center coverage will yield lower scattering than higher scattering center coverage (assuming individual scattering centers are discrete, i.e., they do not merger to form larger scattering centers). Scattering center coverage can vary from 5% or more to about 75%. For example, scattering center coverage can be 10% or more, 15% or more, 20% or more, 25% or more, 30% or more, 35% of more, 40% or more, 45% or more, such as 50% or 55%). Scattering center coverage can be selected according to a comfort level of a user, e.g., to provide a level of peripheral vision sufficiently comfortable that the wearer will voluntarily wear the eyeglasses for extended periods (e.g., all day) and/or according to the desired intensity with which the axial eye length growth signal is suppressed.

While the scattering centers are depicted as have circular footprints in FIG. 9B, more generally the scattering centers can have other shapes. For example, the scattering centers can be elongated in one direction (e.g., in the x-direction or y-direction), such as in the case of elliptical scattering centers. In some embodiments, the scattering centers are random on shape.

It is believed that light from a scene that is incident on the lenses in reduced contrast areas 930a and 930b between the scattering centers contributes to an image of the scene on the user's retina, while light from the scene incident on the scattering centers does not. Moreover, the light incident on the scattering centers is still transmitted to the retina, so has the effect of reducing image contrast without substantially reducing light intensity at the retina. Accordingly, it is believed that the amount of contrast reduction in the user's peripheral field of view is correlated to (e.g., is approximately proportional to) the proportion of the surface area of the reduced-contrast areas covered by the scattering centers. Generally, scattering centers occupy at least 10% (e.g., 20% or more, 30% or more, 40% or more, 50% or more, such as 90% or less, 80% or less, 70% or less, 60% or less) of the area (as measured in the x-y plane) of reduced contrast area 930a and 930b.

In general, the scattering center pattern reduces the contrast of images of objects in the wearer's peripheral vision without significantly degrading the viewer's visual acuity in this region. Here, peripheral vision refers to the field of vision outside of the field of the clear aperture. Image contrast in these regions can be reduced by 40% or more (e.g., 45% or more, 50% or more, 60% or more, 70% or, more, 80% or more) relative to an image contrast viewed using the clear aperture of the lens as determined. Contrast reduction may be set according to the needs of each individual case. It is believed that a typical contrast reduction would be in a range from about 50% to 55%. Contrast reductions of lower than 50% may be used for very mild cases, while subjects who are more predisposed might need a higher than 55% contrast reduction. Peripheral visual acuity can be corrected to 20/30 or better (e.g., 20/25 or better, 20/20 or better) as determined by subjective refraction, while still achieving meaningful contrast reduction. In embodiments, contrast reduction can result in loss of two or fewer Snellen chart lines (e.g., 1.5 or fewer lines, one line or less), where one line of loss corresponds to a visual acuity drop e.g. from 20/20 to 20/25.

Contrast, here, refers to the difference in luminance between two objects within the same field of view. Accordingly, contrast reduction refers to a change in this difference.

Contrast and contrast reduction may be measured in a variety of ways. In some embodiments, contrast can be measured based on a brightness difference between different portions of a standard pattern, such as a checkerboard of black and white squares, obtained through the clear aperture and scattering center pattern of the lens under controlled conditions.

Alternatively, or additionally, contrast reduction may be determined based on the optical transfer function (OTF) of the lens (see, e.g., http://www.montana.edu/jshaw/documents/18%20EELE582_S15_OTFMTF.pdf). For an OTF, contrast is specified for transmission of stimuli in which light and dark regions are sinusoidally modulated at different "spatial frequencies." These stimuli look like alternating light and dark bars with the spacing between bars varying over a range. For all optical systems the transmission of contrast is lowest for the sinusoidally varying stimuli having the highest spatial frequencies. The relationship describing the transmission of contrast for all spatial frequencies is the OTF. The OTF can be obtained by taking the Fourier transform of the point spread function. The point spread function can be obtained by imaging a point source of light through the lens on to a detector array and determining how light from a point is distributed across the detector.

In the event of conflicting measurements, the OTF is technique is preferred. In some embodiments, contrast may be estimated based on the ratio of the area of the lens covered by scattering centers compared to the area of the clear aperture. In this approximation, it is assumed that all the light that hits the scattering centers becomes uniformly dispersed across the entire retinal area, which reduce the amount of light available in lighter areas of an image and this adds light to darker areas. Accordingly, contrast reduction may be calculated based on light transmission measurements made through the clear aperture and scattering center pattern of a lens.

Generally, the refractive index mismatch between the lens material and the scattering center material affects the amount of light scattered at each scattering center, e.g., as calculated using a point spread function. Typically, the larger the refractive index mismatch between the materials, the more incident light will be scattered. Accordingly, refractive index mismatch can be used as a design parameter with which to optimize the scattering properties of the scattering centers.

In some embodiments, the scattering center material is selected to have a refractive index that is within 0.1 (e.g., within 0.09 or less, 0.08 or less, 0.07 or less, 0.06 or less, 0.05 or less, 0.04 or less, 0.03 or less, 0.02 or less, 0.01 or less, 0.005 or less, 0.002 or less, 0.001 or less) of the refractive index of the lens material (e.g., as measured at one or more wavelengths in the visible light range).

In certain embodiments, larger refractive index mismatches (e.g., more than 0.1) are possible. For example, the scattering center material can be selected to have a refractive index that differs from the refractive index of the lens material by 0.15 or more (e.g., 0.2 or more, 0.25 or more, 0.3 or more, 0.35 or more, such as up to about 0.4).

In general, the refractive index of each scattering center can be the same or different. For example, where the scattering centers are each formed from the same material, each one can have the same refractive index. Alternatively, in some embodiments, the refractive index can vary from scattering center-to-scattering center or between different groups of scattering centers. For example, in certain implementations, the refractive index mismatch between the scattering centers and the lens bulk material can increase as the radial distance from the lens axis increases in order to increasing the amount of light scattering from each scattering center as the radial distance from the lens axis increases.

In some instances, scattering centers can be formed from materials that absorb at least some light incident thereon, such as dyes. The materials can be selected to absorb broadband visible light, or absorb light only at certain wavelengths (e.g., absorb a short wavelength component or long wavelength component). It is believed that light absorptive materials can help reduce glare and/or provide another design parameter for shaping the point spread function of the scattering centers. In some embodiments, exposure to radiation can change the lens material from transparent to absorptive at certain wavelengths. For instance, the exposing radiation can burn the lens material in order to form light absorbing centers in the lens material or on its surface.

Reduced contrast areas 930*a/b* can have a circular shape on the lens blank, although other shapes are also possible (e.g., elliptical, polygonal, or other shape). The size of light scattering area is typically selected so that reduced contrast of the user's peripheral vision is experienced over a substantial part of the user's visual field, even when not looking directly through the on-axis aperture. Light scattering area 930 can have a diameter (or maximum dimension, for non-circular areas) of 30 mm or more (e.g., 40 mm or more, 50 mm or more, 60 mm or more, 70 mm or more, 80 mm or more e.g., 100 mm or less, 90 mm or less, 80 mm or less, 70 mm or less, 60 mm or less). In some embodiments, the light scattering area extends to the edge of the lens.

As noted previously, in general, the size, spacing, and arrangement of the scattering center pattern can vary. In some embodiments, the scattering center pattern features a gradient in, e.g., scattering center size and/or spacing. Scattering center patterns can feature a gradient in scattering efficiency of the scattering centers (e.g., due to a gradient in the refractive index mismatch and/or shape of each scattering center). Graded scattering center patterns can reduce the conspicuity of the pattern. For example, a graded transition from the clear portions of the lens to the scattering portion can be less conspicuous than a sharp transition.

In some embodiments, a lens can feature different zones in which the scattering center pattern varies from zone-to-zone. For example, referring to FIGS. 10A and 10B, a lens 1000 includes a clear aperture 1010, a transition zone 1020, and a scattering zone 1030. Clear aperture 1010 has a radius R1010 and transition zone 1020 is an annular region surrounding the clear aperture having an inner radius $R_{1010}$ and an outer radius $R_{1020}$. The remainder of the lens area forms scattering zone 1030.

Transition zone 1020 features a scattering center pattern that scatters incident light less than the scattering center pattern in scattering zone 1030, providing a transition in the scattering properties of the lens from the clear aperture to the scattering zone. Such a transition may be advantageous in that it reduces scattering into the fovea compared to scattering that would be provided if the scattering zone extended to the clear aperture. A further advantage is that the transition zone may reduce the visibility of the scattering center pattern to the user, providing a more comfortable wearing experience. This can be particularly important for children, where the likelihood that a child will regularly wear eyeglasses featuring such lenses for extended periods depends on the child's comfort level.

Generally, the scattering center pattern in transition zone 1020 can vary. In some embodiments, the transition zone features a uniform scattering center pattern in which the scattering centers have the same shape and size and are uniformly spaced. Alternatively, in certain embodiments, the scattering center pattern in the transition zone can feature varying scattering center density, spacing, and/or size. For example, the scattering center pattern can be selected to provide the weakest scattering closest to the clear aperture, with monotonically increasing scattering at increasing radial distances from $R_{1010}$ to $R_{1020}$. For example, in some embodiments, the scattering center density increases monotonically (e.g., linearly) from $R_{1010}$ to $R_{1020}$. By way of example, the scattering center diameter can increase linearly from a first value (e.g., 0.05 mm) to a second value (e.g., 0.17 mm) as the radial distance from the lens axis increases from $R_{1010}$ to $R_{1020}$. Alternatively, or in addition, the scattering center spacing can decrease monotonically (e.g., linearly) from $R_{1010}$ to $R_{1020}$.

Typically, $R_{1010}$ is in a range from about 1 mm to about 3 mm (e.g., 1.0 mm to 1.1 mm, 1.1 mm to 1.2 mm, 1.2 mm to 1.3 mm, 1.3 mm to 1.4 mm, 1.4 mm to 1.5 mm, 1.5 mm to 1.6 mm, 1.6 mm to 1.7 mm, 1.7 mm to 1.8 mm, 1.8 mm to 1.9 mm, 1.9 mm to 2.0 mm, 2.0 mm to 2.1 mm, 2.1 mm to 2.2 mm, 2.2 mm to 2.3 mm, 2.3 mm to 2.4 mm, 2.4 mm to 2.5 mm, 2.5 mm to 2.6 mm, 2.6 mm to 2.7 mm, 2.7 mm to 2.8 mm, 2.8 mm to 2.9 mm, 2.9 mm to 3.0 mm).

$R_{1020}$ can be in a range from about 2 mm to about 6 mm (e.g., 2.0 mm to 2.2 mm, 2.2 mm to 2.4 mm, 2.4 mm to 2.6 mm, 2.6 mm to 2.8 mm, 2.8 mm to 3.0 mm, 3.0 mm to 3.2 mm, 3.2 mm to 3.4 mm, 3.4 mm to 3.6 mm, 3.6 mm to 3.8 mm, 3.8 mm to 4.0 mm, 4.0 mm to 4.2 mm, 4.2 mm to 4.4 mm, 4.4 mm to 4.6 mm, 4.6 mm to 4.8 mm, 4.8 mm to 5.0 mm, 5.0 mm to 5.2 mm, 5.2 mm to 5.4 mm, 5.4 mm to 5.6 mm, 5.6 mm to 5.8 mm, 5.8 mm to 6.0 mm).

In some embodiments, the scattering center or lenlet pattern includes randomly displacing scattering centers or lenslets with respect to a regular array. Introducing random displacements can reduce optical effects associated with regularly spaced scattering centers or lenslets, such as starburst-like glare. See, e.g., https://www.slrlounge.com/diffraction-aperture-and-starburst-effects/which illustrates the starburst effect as it relates to photography. Accordingly, including random displacements in scattering center or lenslet patterns can provide the user with a more comfortable experience compared with similar scattering center or lenslet patterns in which the scattering centers or lenlets are uniformly spaced. Alternatively, or additionally, randomization of the scattering center or lenslet pattern can reduce the optical effects (e.g., diffractive or interference effects) that manifest in reflected light, reducing the noticeability of the scattering center or lenslet patterns to observers.

Random displacements are illustrated in FIG. 10C, which shows scattering centers or lenslets 1001a-1001e positioned with respect to an array lattice in which adjacent lattice sites are spaced a distance $D_x$ from each other in the x-direction and a distance $D_y$ from each other in the y-direction. As illustrated, $D_x=D_y$, however, more generally, the vertical and horizontal lattice spacing can be different.

For each scattering center or lenslet, $\delta x = A_x \cdot D_x \cdot RN[0,1]$ and $\delta y = A_y \cdot D_y \cdot RN[0,1]$ where $A_x$ and $A_y$ are jitter amplitudes between 0 and 1 in the x- and y-directions, respectively, which may be the same or different. $RN[0,1]$ is a random number between 0 and 1.

Scattering center or lenslet size can also vary randomly, which can reduce optical effects associated with an array of uniformly sized scattering centers or lenslets, such as glare. For example, as illustrated in FIG. 10C, the radial dimension of each scattering center (or lenslet) can vary from a nominal scattering center (or lenslet) radius, $r_0$. As illustrated, scattering center (or lenslet) 1001d has nominal scattering center (or lenslet) radius $r_0$, while scattering centers (or lenslet) 1001b and 1001e have radii $r_b$ and $r_e$, respectively that are both larger than $r_0$ and $r_n \neq r_e$. Scattering center or lenslet radius can be set according to a formula $r_i = r_0 + \Delta r$, where $\Delta r = \Delta r \cdot r_0 \cdot RN[0,1]$, in which i refers to the i-th scattering center and $\Delta r$ is the scattering center or lenslet radius jitter amplitude which is set to a value between 0 and 1.

More generally, while the example above refers to scattering center radius of a nominally circular scattering center, jitter can be applied to other scattering center-size parameters depending on the application. For example, jitter can be applied to scattering center volume or other scattering center dimensions (e.g., x-dimension, y-dimension). Likewise for lenslets, jitter can be applied, besides to the radius or spacing, to refractive index, surface curvature, thickness and geometry, such as ellipticity or asphericity as examples.

In some embodiments, scattering center or lenslet patterns can include both random jitter in scattering center or lenslet placement and random jitter in scattering center or lenslet size.

Exemplary scattering center patterns featuring a transition zone are shown in FIGS. 11A-11F. The patterns in FIGS. 11A, 1C, and 1E feature uniformly spaced scattering centers in the scattering zone. The patterns in FIGS. 11B, 11D, and 11F feature scattering centers that are randomly displaced from uniform spacing. The units for both the horizontal and vertical axes are mm. Each of FIGS. 11A-11F includes an inset showing a magnified view of the corresponding scattering center pattern. The parameters characterizing the scattering center patterns are provided in the table below.

| FIG. | Scattering center Pattern | Clear Aperture radius | Transition Zone radius | Scattering Zone Scattering center lattice spacing | Scattering center dimension | Jitter amplitude |
|---|---|---|---|---|---|---|
| 5A | DOT-02-210-170 | 2 mm | 3.5 mm | 0.21 mm | 0.17 mm | 0 |
| 5B | 210-170-JITTERED | 2 mm | 3.5 mm | 0.21 mm | 0.17 mm | 0.1 |
| 5C | DOT-02-240-170 | 2 mm | 3.5 mm | 0.24 mm | 0.17 mm | 0 |
| 5D | 240-170-JITTERED | 2 mm | 3.5 mm | 0.24 mm | 0.17 mm | 0.15 |
| 5E | DOT-02-365-170 | 2 mm | 3.5 mm | 0.365 mm | 0.17 mm | 0 |
| 5F | 365-170-JITTERED | 2 mm | 3.5 mm | 0.365 mm | 0.17 mm | 0.2 |

In some embodiments, the scattering center or lenslet pattern features a gradient in, e.g., scattering center size and/or spacing. Scattering center patterns can feature a gradient in scattering efficiency of the scattering centers (e.g., due to a gradient in the refractive index mismatch and/or shape of each scattering center). Lenslet patterns can feature a gradient e.g. in refractive power or diameter. Graded scattering center or lenslet patterns can reduce the conspicuity of the pattern. For example, a graded transition from the clear portions of the lens to the scattering portion can be less conspicuous than a sharp transition.

Figure 12A:
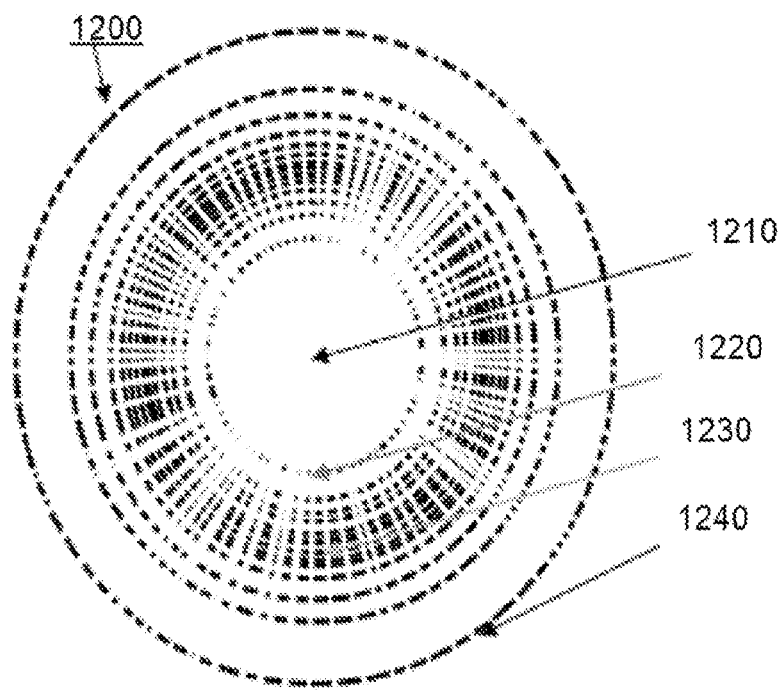
FIGS. 12A-12B show further examples of patterns of optical elements for an ophthalmic lens for reducing myopic progression.
Figure 12B:
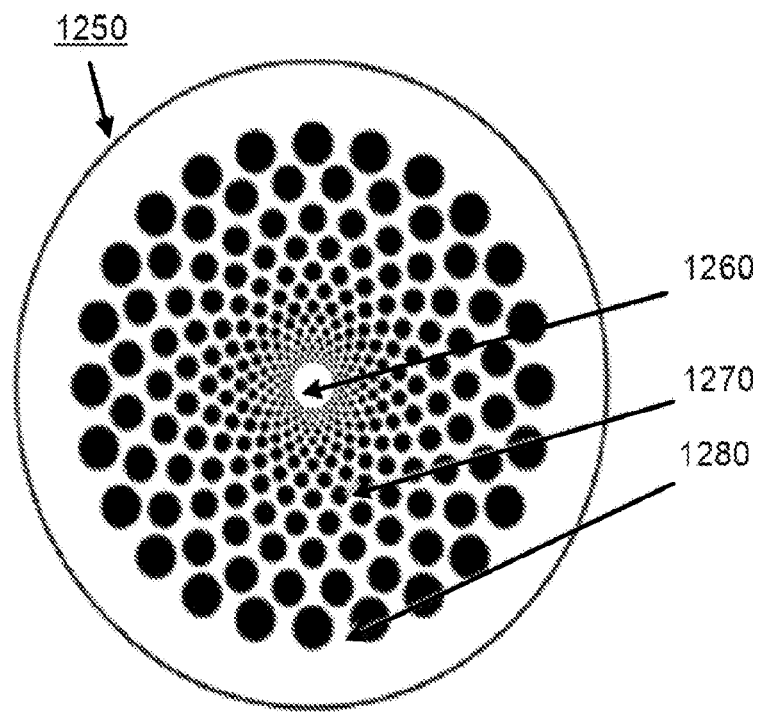

Referring to FIGS. 12A and 12B, exemplary graded scattering center patterns are shown.

Specifically, FIG. 12A shows a graded scattering center pattern 1200 with different spacing between adjacent scattering centers. Clear aperture 1210 transitions into low-density region 1220. In region 1220, distance between adjacent scattering centers is relatively large, thus rendering a low density of scattering centers in region 1220. Low-density region 1220 then transitions into high-density region 1230, where the spacing between adjacent scattering centers is small, thus rendering a high density of scattering centers. High-density region 1230 then transitions into low-density region 1240, where the spacing between adjacent scattering centers is again increased. As a result, due to the graded transition from clear aperture 1210 to the outer edge of the lens, the graded scattering center pattern can be less conspicuous compared to a transition to a higher density, uniform scattering center pattern. The same principle applies to lenslets.

Scattering center or lenslet density can be controlled not only by the spacing between adjacent scattering centers, but also by scattering center or lenslet size. Referring to FIG. 12B, for example, a scattering center pattern 1250 features scattering centers close to clear aperture 1260 that have smaller size compared to scattering centers closer to an edge 1280 of the scattering center pattern.

In another example, a lens can have a graded scattering center or lenslet pattern with both varying scattering center or lenslet size and scattering center-to-scattering center or lenslet-to-lenslet distance.

The shape and/or composition of scattering centers or lenslets can also vary radially, yielding a graded pattern. For bulk scatter centers, for example, a graded pattern can be provided by forming scatter centers with a lower refractive index mismatch compared to the lens bulk material closer to the edges of the scattering center pattern compared to scatter centers in the center of the scattering center pattern.

Figure 13:
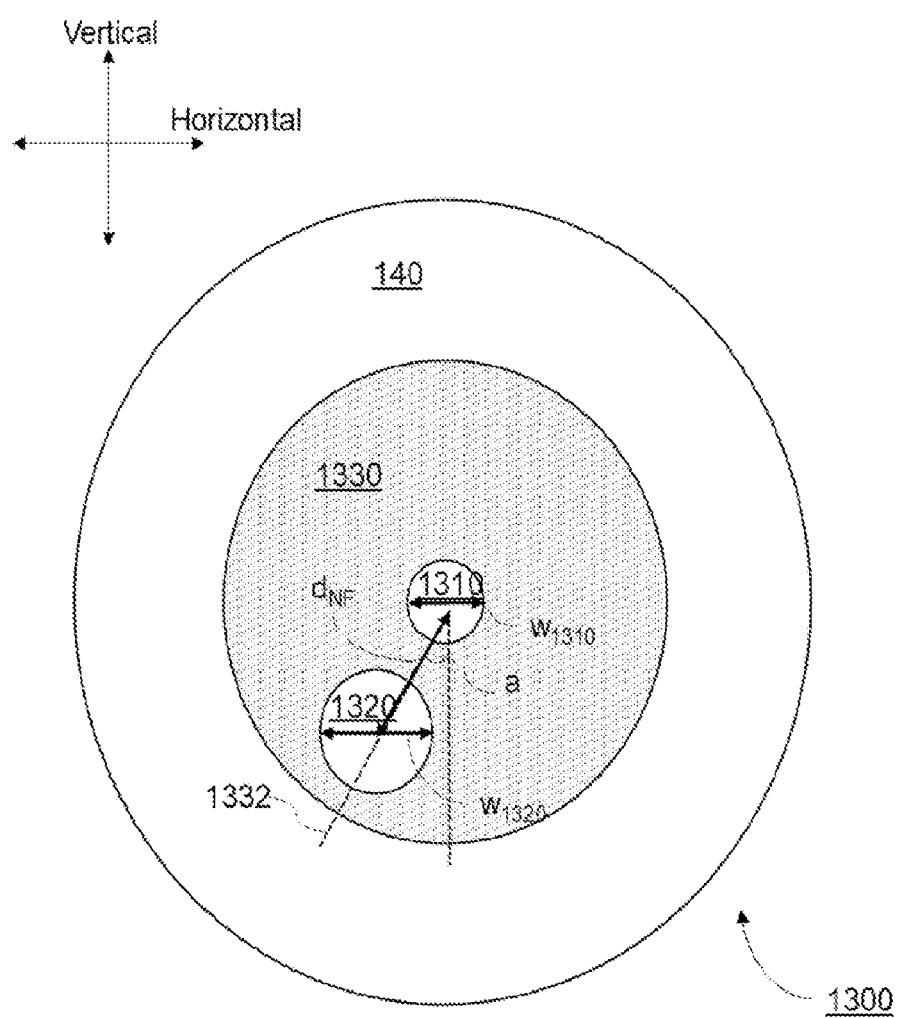
FIG. 13 shows yet a further example of an ophthalmic lens for reducing myopic progression.

Referring to FIG. 13, an ophthalmic lens 1300 includes a first clear aperture 1310 and an annular shaped scattering or defocus area 1330 surrounding the clear aperture. In this case, the lens 1300 has uniform optical properties, e.g., is a single vision lens, such as a spherical lens or a compound or toric lens (i.e., having a spherical component and a cylindrical component), or a plano lens (i.e., a lens with no optical power). FIG. 13 also shows a vertical and horizontal axis for ease of reference. While lens 1300 is depicted as a circular blank, and therefore rotationally symmetric for a spherical lens, it will be understood that the horizontal and vertical directions refer to how the lens will be oriented when mounted in glasses frames.

First clear aperture 1310 is positioned substantially near the center of lens 1300. Scattering or defocus area 1330 is also centered with respect to the lens center. Scattering area 1330 is also surrounded by a clear area 1340. A second clear aperture 1320 is also provided in light scattering or defocus area 1330, separated from clear aperture 1310 along an axis 1332 that is offset by an angle α from the vertical axis of the lens.

The horizontal and vertical axes refer to how lens 1300 is ultimately oriented in a pair of eyeglass frames. In an unmounted spectacle lens 1300 prior to shaping for mounting in a frame, where the lens is plano or spherical, such lenses are generally radially symmetric and the angle α is arbitrary until the lens is shaped for mounting. However, in lenses which do not possess rotational symmetry, such as toric lenses, the angle α can alternatively can be defined relative to the orientation of the second aperture 1320 compared to the axis of the cylindrical component. Of course, where the cylinder axis is parallel to the vertical axis, α will be the same regardless of how it is defined.

In the embodiment show in FIG. 13, clear aperture 1310 is a distance vision aperture, which can be engaged for distance-vision activities such as reading road signs. The second clear aperture 1320 is a near vision aperture, which can be engaged for near-vision activities, such as reading a book.

In general, α can vary. When compared to an axis of cylindrical power, the offset angle α can vary between 0 and 180 degrees.

When α refers to the offset angle from the vertical meridian once mounted, it can be selected to accommodate the path of the user's eye when they focus on near objects. When a person accommodates to focus on near objects, this also creates convergence, or the movement of the eyes inward in the horizontal direction, called vergence. Therefore, in order to make near-vision objects visible to the accommodated eye through the second aperture, the angle can be chosen to match a user's vergence for near objects. In some embodiments, a is 45° or less, e.g., about 30° or less, about 25° or less, about 20° or less, about 15° or less, about 10° or less, about 8° or less, e.g., 10 or more, 2° or more, 3° or more, 4° or more, 5° or more, or 0°. For example, the clear aperture 1320—for near-vision—can be offset from the vertical axis that passes through the center of clear aperture 1310 toward the user's nose in order to accommodate for vergence of the wearer's eyes as they focus on near objects. This offset can be 1 mm or more (e.g., 2 mm or more, 3 mm or more, 4 mm or more, 5 mm or more, 6 mm or more, 7 mm or more, such as 10 mm or less, 9 mm or less, 8 mm or less), where the distance is measured from the central point in the horizontal direction of clear aperture 1320 from the central point in the horizontal direction of clear aperture 1310 (which may correspond to the center of the lens, in some embodiments). Both clear aperture 1310 and clear aperture 1320 are circular in shape, with aperture 1320 having a slightly larger diameter than aperture 1310. Generally, the size of the apertures can vary and are set so that they provide the user with adequate on-axis vision (through aperture 1310) and adequate near-vision (through aperture 1320) while not being so large as to significantly impede the effect of the contrast reduction or defocus in peripheral vision due to the scattering or the lenslet area, respectively. Typically, both clear apertures have diameters of 2 mm or more (e.g., 3 mm or more, 4 mm or more, 5 mm or more, such as 10 mm or less).

Non-circular apertures are also possible (see below for specific examples). For instance, the horizontal width of an aperture can be different from a vertical height of the apertures. In FIG. 13, the horizontal widths of apertures 1310 and 1320 are designated $w_{110}$ and $w_{120}$, respectively. Generally, the horizontal widths of the apertures can be the same or different. In some embodiments, such as illustrated in FIG. 13, $w_{1320}$ can be larger than $w_{1310}$. For example, $w_{120}$ can be 10% or more larger than $w_{1310}$ (e.g., 20% or more, 30% or more, 40% or more, 50% or more, 75% or more, 100% or more, such as 200% or less, 150% or less, 120% or less). In some embodiments, the $w_{1320}$ is selected so that, for near vision, the user's visual axis stays within the clear aperture 1320 while the user is engaged with a specific task during which their eye horizontally scans a visual field (e.g., while reading). This can be advantageous where it allows the user to scan the visual field through the clear aperture without having to move their head.

The distance between the apertures can also vary and is typically set so that the apertures correspond to comfortable on-axis vision and comfortable near-vision for the user. The distance between the closest edges of the clear apertures can be 1 mm or more (e.g., 2 mm or more, 5 mm or more, such as 10 mm or less).

A distance between the centers of aperture 1310 and aperture 1320, denoted $\delta_{NF}$ in FIG. 13, can vary so that aperture 1320 corresponds to gaze direction of the user when focused on near objects. In some embodiments, $\delta_{NF}$ can be in a range from 0.5 mm to 20 mm (e. g., 0.6 mm or more, 0.7 mm or more, 0.8 mm or more, 0.9 mm or more, 10 mm or more, 11 mm or more, 12 mm or more, 13 mm or more, 14 mm or more, e.g., 19 mm or less, 18 mm or less, 17 mm or less, 16 mm or less, 15 mm or less).

The separation between aperture 1310 and aperture 1320 depends on the size of each aperture and the distance between their centers. In some embodiments, this separation can be 0.5 mm or more (e.g., 1 mm or more, 2 mm or more, 3 mm or more). The separation can be less than 10 mm (e.g., 9 mm or less, 8 mm or less, 7 mm or less, 6 mm or less, 5 mm or less).

Light scattering area 1330 includes scattering centers which scatter at least some of the light incident on the lens in these areas. This can reduce contrast of the peripheral vision of a user, which is believed to reduce development of myopia in a user. Generally, scattering centers can include features (e.g., protrusions or depressions) on a surface in the lens or inclusions in the bulk lens material. Patterns of scattering centers suitable for the light scattering area are described, for example, in PCT Application WO 2018/026697, entitled "OPHTHALMIC LENSES FOR TREATING MYOPIA," filed on Jul. 31, 2017, in Provisional Application No. 62/671,992, entitled "OPHTHALMIC LENSES WITH LIGHT SCATTERING FOR TREATING MYOPIA," filed May 15, 2018, and in U.S. Patent Publication No. US-2019-0235279-A1, entitled "OPHTHALMIC LENSES WITH LIGHT SCATTERING FOR TREATING MYOPIA," published on Aug. 1, 2019. The contents of each of these applications are incorporated herein by reference in their entirety.

In some embodiments the periphery of the light scattering or defocus area can be blended with the clear area by gradually reducing the light scattering amount, density or power.

In some embodiments the clear area can exhibit a lower amount of light scattering or defocus compared to the light scattering or defocus area.

In some embodiments, an ophthalmic lens can include a single elongated aperture that extends from a distance vision region of the lens to the near vision region.

In the foregoing embodiments, the ophthalmic lens is a single vision, toric, aspheric or optically neutral or plano (i.e., no optical power) lens. More generally, other embodiments are also possible. For instance, multifocal lenses such as bifocal (e.g., prismatic bifocals), trifocal, multi-focal, freeform or progressive lenses can be used.

When multi-focal lenses are used, the near-vision lens area serves two functions. When the viewer is looking through the distance viewing aperture, the near-viewing area provides peripheral defocus. Peripheral defocus is known to reduce myopic progression, for example as described in U.S. Pat. No. 7,025,460. When the viewer is looking through the near-vision aperture, the near-vision lens area typically contains positive lens power (i.e., it has more dioptric focusing compared to the distance viewing portion of the lens) to help the user focus for near vision tasks.

The rest of the lens area has a different optical power selected for distance vision task.

Figure 14:
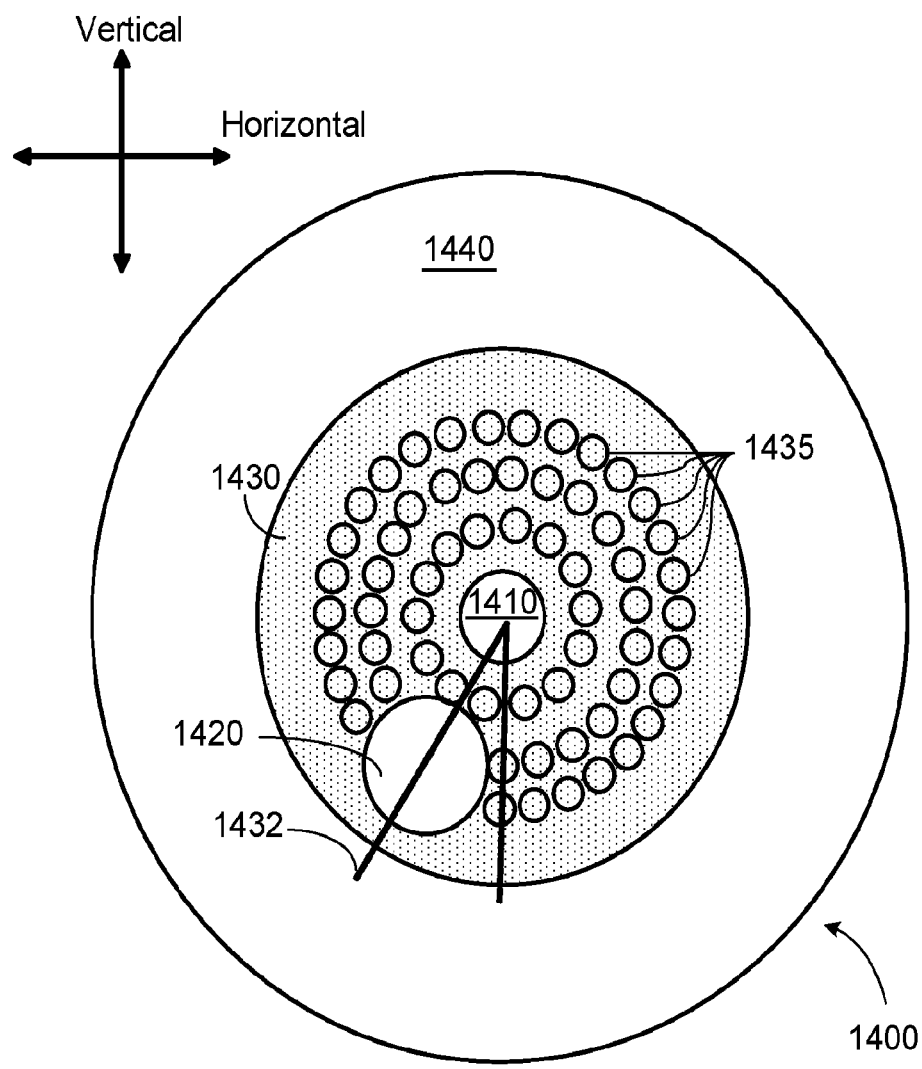
FIG. 14 shows another example of an ophthalmic lens for reducing myopic progression.

Furthermore, while the foregoing embodiments feature a scattering area having features (i.e., scattering centers) that scatter, rather than focus, incident light, other implementations are also possible. For example, a lens can include one or more lenslets having an optical power different from the base lens in the areas identified as "scattering areas" in the embodiments described above. Examples of such lenslets are disclosed, for example, in U.S. Pat. No. 10,268,050 entitled "Spectacle Lens" issued on Apr. 23, 2019, and in PCT Publication WO 2019/166653, entitled "Lens Element" published on Sep. 6, 2019. Referring to FIG. 14, an example lens 1400 includes a clear outer region 1440, a light scattering area 1430, a first clear aperture 1410 for distance vision and a second clear aperture 1420 for near vision. Second clear aperture 1420 is aligned along an axis 1432 that is offset by an angle, u, from the vertical axis of the lens.

Generally, the optical properties of lenslets can vary depending on the degree of defocus considered appropriate for a user. For example, the lenslets can be spherical or aspherical. The lenslets can have positive or negative optical power. In some embodiments, the optical power of the lenslets is zero (e.g., wherein the base power of the lens is strongly negative). The lenslets have each have the same optical power or different lenslets can have differing optical power. In some embodiments, lenslets can have an add power of +0.25 D or more (e.g., +0.5 D or more, +0.75 D or more, +1.0 D or more, +1.25 D or more, +1.5 D or more, +1.75 D or more, +2.0 D or more, +3.0 D or more, +4.0 D or more; such as up to +5.0 D) compared to the base optical power of the lens. In certain embodiments, lenslets can have an add power of −0.25 D or less (e.g., −0.5 D or less, −0.75 D or less, −1.0 D or less, −1.25 D or less, −1.5 D or less) compared to the base optical power of the lens The size of the lenslets can also vary as appropriate. The lenslets can have a diameter of 0.5 mm or more (e.g., 0.8 mm or more, 1 mm or more, 1.5 mm or more, 2 mm or more, 3 mm or more; such as up to 5 mm).

Scattering area 1430 includes scattering centers as described above. In addition, scattering area 1435 includes lenslets 1435 arranged in rings around aperture 1410. The lenslets introduce defocus to portions of a wavefront that would otherwise be focused onto the user's retina. Scattering centers are included at the locations of lenslets 1435. For example, scattering centers can be formed on a surface of each lenslet 1435, on the opposite lens surface but overlapping with the same lateral positions as lenslets 1435, and/or included within the bulk of lens 1400 overlapping laterally with lenslets 1435. In some embodiments, scattering centers are included between lenslets 1435, but do not laterally overlap with the lenslets. In certain embodiments, the scattering area of the lens includes only lenslets, but not additional scattering centers.

Figure 15:
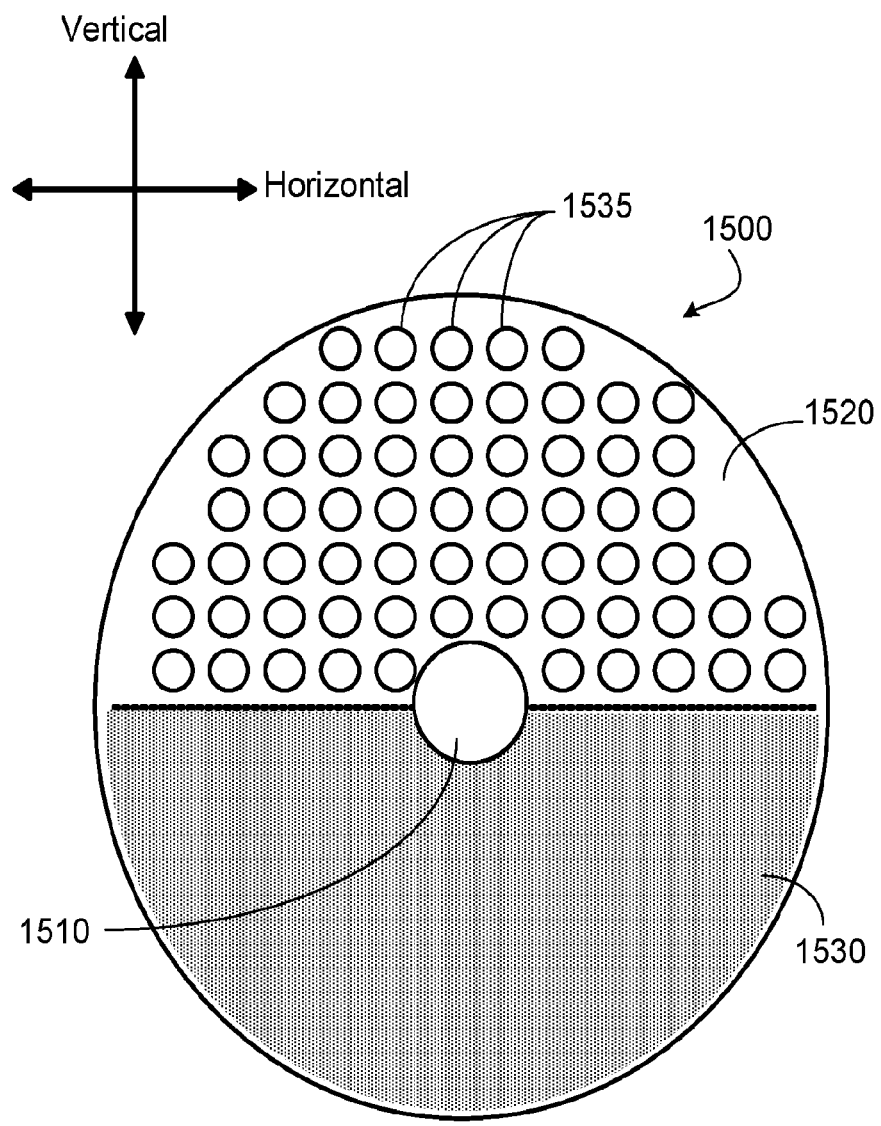
FIG. 15 shows a further example of an ophthalmic lens for reducing myopic progression.

In some implementations, the techniques described above can be used to generate other patterns of lenslets and scattering centers on a surface of an ophthalmic lens. For example, certain areas of the ophthalmic lens surface can exclusively include lenslets while other areas exclusively include scattering centers. An example of such a lens is shown in FIG. 15, in which an ophthalmic lens 1500 includes a clear central aperture 1510 surrounded by an array of lenslets 1535 in a top half 1520 of the lens and scattering centers in a bottom half 1530.

Other arrangements and distributions of lenslets and scattering centers are possible and can be formed using a single laser system.

Other embodiments are encompassed by the following claims.

What is claimed is:

1. A method, comprising:
coating a layer of a first material on a surface of an ophthalmic lens composed of a lens material, the first material being different from the lens material;
exposing the layer of the first material to laser radiation sufficient to remove the first material from discrete locations of the layer and form pits in the surface of the ophthalmic lens at those locations;
after exposing the layer of the first material, depositing a second material over the layer of the first material, wherein the second material fills the pits in the surface of the ophthalmic lens; and
after depositing the second material, removing the layer of the first material from the surface of the ophthalmic lens to provide a pattern of spaced apart regions of the second material on the surface of the ophthalmic lens.

2. The method of claim 1, wherein at least some of the regions of the spaced apart regions of the second material are myopic defocus lenslets.

3. The method of claim 1, wherein at least some of the regions of the spaced apart regions of the second material are scattering centers.

4. The method of claim 1, wherein the regions of the spaced apart regions of the second material comprise both myopic defocus lenslets and scattering centers.

5. The method of claim 4, wherein the myopic defocus lenses and scattering centers occupy mutually exclusive areas of the surface of the ophthalmic lens.

6. The method of claim 4, wherein at least some of the myopic defocus lenses and scattering centers occupy a common area of the surface of the ophthalmic lens.

7. The method of claim 1, wherein the exposure and deposition are synchronized so deposition commences before exposure is complete.

8. The method of claim 7, wherein exposing the layer of the first material to laser radiation comprises forming first and second pits of the pits, and filling the pits in the surface of the ophthalmic lens comprises filling the first and the second pits, and wherein exposing the second pits occurs after both forming and filling the first pit.

9. The method of claim 7, wherein the synchronized exposure and deposition are performed by simultaneously moving relative to the lens surface a laser and print nozzle that are fixed relative to each other.

10. The method of claim 1, wherein the deposition involves depositing discrete volumes of the first material in the pits.

* * * * *